United States Patent
Schwaiger et al.

(10) Patent No.: US 8,006,596 B2
(45) Date of Patent: Aug. 30, 2011

(54) CUTTING TOOL AND PARTS AND ACCESSORIES THEREFOR

(75) Inventors: Barry M. Schwaiger, Hampshire, IL (US); William J. Phillips, Bolingbrook, IL (US)

(73) Assignee: Walter Meier (Manufacturing) Inc., La Vergne, TN (US)

( * ) Notice: Subject to any disclaimer, the term of this patent is extended or adjusted under 35 U.S.C. 154(b) by 484 days.

(21) Appl. No.: 11/373,573

(22) Filed: Mar. 10, 2006

(65) Prior Publication Data

US 2006/0201301 A1     Sep. 14, 2006

Related U.S. Application Data

(60) Provisional application No. 60/660,554, filed on Mar. 11, 2005.

(51) Int. Cl.
*B23D 45/06* (2006.01)
(52) U.S. Cl. .......... 83/477.1; 83/477.2; 83/473; 83/477
(58) Field of Classification Search ............ 83/473, 83/477.2, 477, 665, 666; 74/665 F, 670, 74/350, 405, 423, 425, 347
See application file for complete search history.

(56) References Cited

U.S. PATENT DOCUMENTS

| | | | |
|---|---|---|---|
| 636,997 A | 11/1899 | Huson | |
| 741,034 A | 10/1903 | Hazelton | |
| 0,901,799 A | 10/1908 | Fillet | |
| 1,194,075 A * | 8/1916 | Rorick | ............. 74/347 |
| 1,920,319 A * | 8/1933 | Regenhardt et al. | ............. 37/383 |
| 2,599,107 A | 6/1952 | Hebestreit | |
| 2,854,044 A * | 9/1958 | Raguse | ............. 144/286.1 |
| 2,964,327 A | 12/1960 | Mohr | |
| 3,178,197 A * | 4/1965 | Boatner | ............. 280/37 |
| 3,179,438 A | 4/1965 | Field | |
| 3,289,713 A | 12/1966 | Herzog | |
| 3,715,015 A | 2/1973 | Morris | |
| 4,068,550 A | 1/1978 | Gray et al. | |
| 4,159,821 A | 7/1979 | Hickman | |
| 4,161,974 A | 7/1979 | Patterson | |

(Continued)

FOREIGN PATENT DOCUMENTS

TW      288233      3/2006

(Continued)

OTHER PUBLICATIONS

TS3650 Operators Manual, 10' Cast Iron Table Saw, Part No. SP6498, Ridgid, Inc., Printed in Taiwan Jun. 2003, 76 pages.

*Primary Examiner* — Robert Scruggs
(74) *Attorney, Agent, or Firm* — Schiff Hardin LLP

(57) ABSTRACT

A cutting tool in accordance with the invention may include an arbor lock, located within its housing, for preventing the arbor from rotating to assist an operator in installing, removing or replacing the saw blade. The cutting tool may also include an internal storage compartment for storing items or equipment, including those for use in connection with the cutting tool, an internal mobility system to assist the operator in moving the cutting tool when desired, and a cutting implement angle memory indicator for aiding the operator in keeping track of a desired cutting implement position. The cutting tool may also be provided with a sturdy bench top extension extending out from the cutting tool housing which the operator may use to perform a variety of workshop tasks including some not related to the use of the cutting tool itself.

44 Claims, 33 Drawing Sheets

U.S. PATENT DOCUMENTS

| | | | |
|---|---|---|---|
| 4,297,921 A | | 11/1981 | Wydra |
| 4,343,214 A | | 8/1982 | Schädlich |
| 4,491,452 A | * | 1/1985 | Matovich ..................... 414/427 |
| 4,532,844 A | | 8/1985 | Chang et al. |
| 4,639,005 A | | 1/1987 | Birkley |
| 4,655,466 A | | 4/1987 | Hanaoka |
| 5,035,445 A | | 7/1991 | Poulin |
| 5,090,126 A | | 2/1992 | Higgins |
| 5,308,094 A | | 5/1994 | McWhorter et al. |
| 5,383,383 A | | 1/1995 | Garuglieri |
| 5,535,766 A | | 7/1996 | Edwards |
| 5,628,522 A | | 5/1997 | Hall |
| 5,875,698 A | | 3/1999 | Ceroll et al. |
| 5,876,173 A | | 3/1999 | English, Jr. |
| 5,940,932 A | | 8/1999 | LaHay |
| 5,950,262 A | | 9/1999 | Smoler et al. |
| 5,957,649 A | | 9/1999 | English, Jr. et al. |
| 5,988,239 A | | 11/1999 | Chen |
| 6,079,931 A | | 6/2000 | English, Jr. et al. |
| 6,095,533 A | * | 8/2000 | Balolia .......................... 280/35 |
| 6,109,157 A | | 8/2000 | Talesky |
| 6,244,149 B1 | | 6/2001 | Ceroll et al. |
| 6,311,992 B1 | | 11/2001 | Theising |
| 6,508,281 B1 | | 1/2003 | Wang |
| 6,631,660 B2 | | 10/2003 | Turos |
| 6,701,629 B2 | | 3/2004 | Krondorfer et al. |
| 6,802,441 B1 | | 10/2004 | DuRant et al. |
| 6,813,983 B2 | | 11/2004 | Gass et al. |
| 6,826,988 B2 | | 12/2004 | Gass et al. |
| 6,840,144 B2 | | 1/2005 | Huang |
| 6,842,988 B2 | | 1/2005 | Johansson |
| 7,093,627 B2 | | 8/2006 | Chuang |
| 7,198,082 B2 | | 4/2007 | Chuang |
| 7,210,386 B1 | | 5/2007 | Chang |
| 7,328,732 B2 | | 2/2008 | Chuang |
| 7,438,301 B2 | * | 10/2008 | Schilling et al. ............. 280/79.7 |
| 7,458,301 B2 | | 12/2008 | Yu |
| 2005/0092155 A1 | * | 5/2005 | Phillips et al. .................. 83/581 |
| 2005/0188806 A1 | * | 9/2005 | Garcia et al. ................. 83/471.3 |
| 2009/0007823 A1 | | 1/2009 | Yu |
| 2009/0212479 A1 | | 8/2009 | Yu |

FOREIGN PATENT DOCUMENTS

| | | |
|---|---|---|
| TW | M288233 | 3/2006 |
| TW | 335374 | 7/2008 |
| TW | M335374 | 7/2008 |

\* cited by examiner

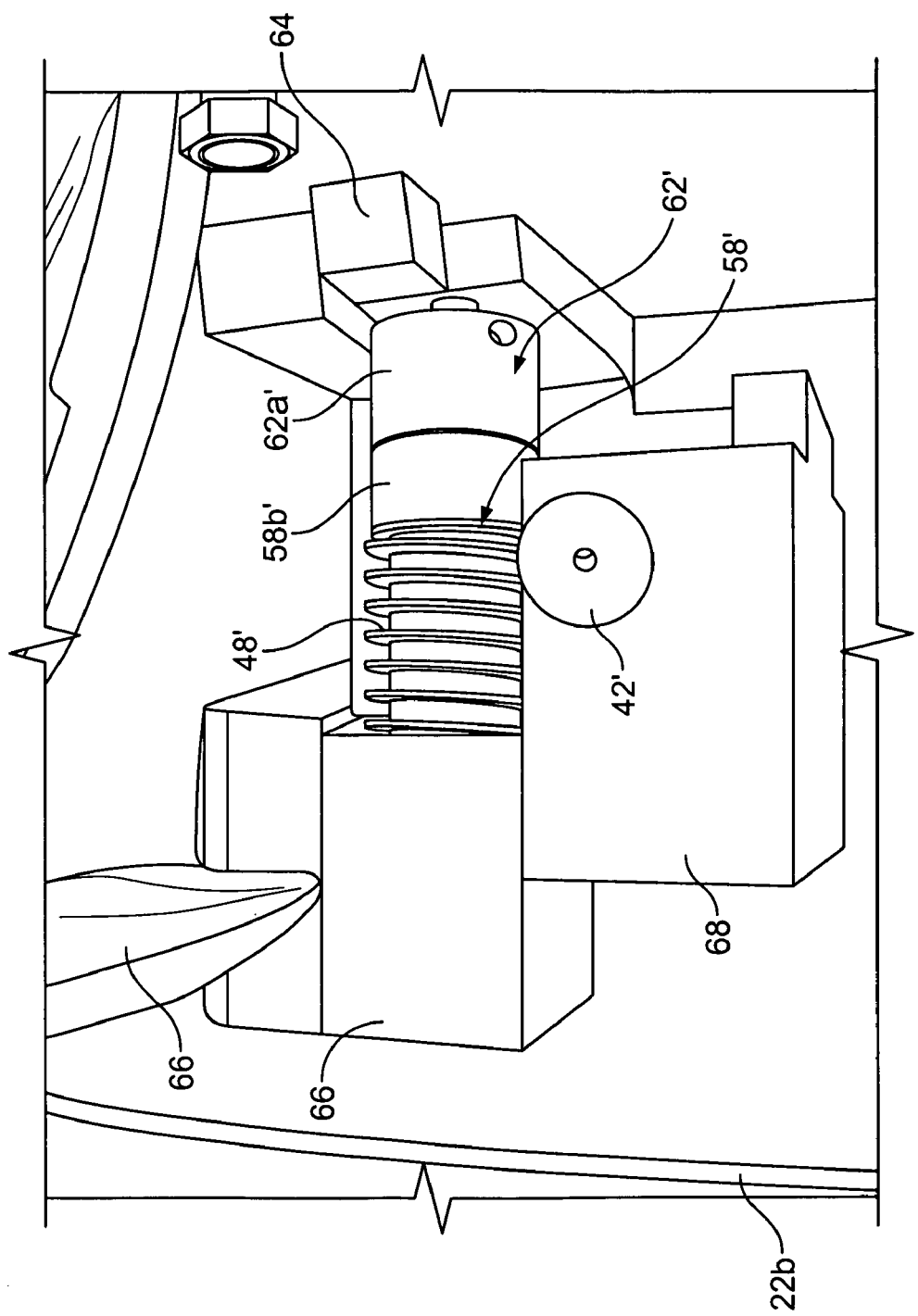

CUTTING TOOL AND PARTS AND ACCESSORIES THEREFOR

CROSS-REFERENCE TO RELATED APPLICATION

This application claims benefit of United States Provisional Application No. 60/660,554, filed Mar. 11, 2005, which is hereby incorporated herein by reference in its entirety.

FIELD OF THE INVENTION

This invention relates generally to cutting tools and more particularly relates to a saw and parts and accessories therefor.

BACKGROUND OF THE INVENTION

In the tool industry there are several different types of cutting tools, such as, for example, table saws, cabinet saws and contractor saws. These tools typically have housings with generally flat work surfaces forming tables upon which workpieces, such as wood or metal, may be set or rested. The table usually defines an opening through which a cutting implement, such as a saw blade, extends in order to perform work on the workpiece. These tools will also often have table extensions, which are coplanar with the upper surface of the work surface and provide additional support and work surface area for larger workpieces. In addition to these common features, however, conventional cutting tools also share a variety of shortcomings with respect to such features as saw blade connection, cutting tool mobility, tool storage, blade angle indication and table extensions.

For example, one common shortcoming with conventional cutting tools is that the tools are not designed to allow for easy attachment, removal and replacement of the saw blade. More particularly, traditional saws have circular saw blades which are connected to an arbor bolt via a nut. In order to attach, remove or replace the saw blade, an operator will have to figure out some way to prevent the arbor and saw blade from rotating as he or she attempts to tighten or loosen the arbor nut.

To date, many different means have been used to prevent the saw blade from rotating when the operator loosens the arbor nut. For example, for many years operators of cutting tools were required to use and operate two separate wrenches in order to loosen or tighten the arbor nut. This proved difficult to do in that the operator needed to focus on holding and operating both wrenches simultaneously and in close proximity to the saw blade.

To reduce the difficulty in using separate wrenches, some operators began using items, such as wood block scraps, to engage the teeth of the saw and prevent the saw blade from rotating while the arbor nut was initially loosened or fully tightened via a single wrench. Over time, operators began using blade covers or blocks which were specifically designed to engage and prevent the saw blade from rotating when the arbor nut was initially loosened or fully tightened. For example, U.S. Pat. No. 4,297,921, issued Nov. 3, 1981 to Wydra, illustrates a circular blade engaging portion (16) made from a wood block, which is used to prevent the blade from rotating while the operator uses another wrench (38) to tighten or loosen the arbor nut so that the saw blade may be attached, removed or replaced.

Conventional blade locks, however, only hold the saw blade, rather than the blade and the arbor. More particularly, blade locks allow the arbor to rotate when the arbor nut is not fully tightened on the arbor, making it necessary to manually hold the arbor with either a hand or second wrench in order to fully tighten or loosen the arbor nut. Other shortcomings associated with such blade locks include the fact that the blade lock itself can be misplaced or lost, can wear to the point the blade is not securely stopped from rotation, and can be difficult to operate with one hand while the operator tries to operate a wrench with his or her other hand.

To accommodate cutting tool operators' desire for assistance in connecting and removing saw blades and in an effort to avoid some of the shortcomings associated with the above-mentioned blade locks, some tool manufacturers have provided systems that allow the user to lock the arbor and prevent it from rotating while the operator uses a wrench to tighten or loosen the arbor nut. For example, U.S. Pat. No. 741,034, issued Oct. 13, 1903 to Hazelton, illustrates a table saw having an arm (20) with a shoe (22) capable of being pivoted into engagement with the arbor to prevent the arbor from rotating so that the arbor nut may be tightened or loosened.

In another example, U.S. Pat. No. 6,109,157 issued Aug. 29, 2000 to Talesky, illustrates an arbor lock plate (47) with a lifting portion (63) for pivoting the arbor lock plate into engagement with the arbor to prevent the arbor from rotating when the arbor nut is tightened or loosened. In yet another example, U.S. Pat. No. 6,244,159 issued Jun. 12, 2001 to Ceroll et al., illustrates a table saw having a lever (188) with a wrench (190) which may be pivoted into engagement with the arbor in order to prevent the arbor from rotating when the arbor nut is tightened or loosened.

Unfortunately, these arbor lock systems often require intricate mechanical components and additional structures or framework to be added to the cutting tool. They also typically crowd the opening in the work surface through which the saw blade extends making it more difficult to reach into the table opening and install, remove or replace the saw blade. In addition, some of these arbor lock systems can increase the possibility of the arbor lock being inadvertently actuated due to their automatic operation, which can cause serious damage to the cutting tool.

Another shortcoming with respect to conventional cutting tools is that the tools are heavy and not easy to move. This is particularly burdensome when the tool is placed in a crowded or small workshop where space is at a premium and tools must be moved often. In an effort to solve this problem some cutting tool manufacturers have added lockable wheels, such as casters, either directly to the cutting tool or via a mobile base assembly which may be connected to the cutting tool. For example, U.S. Pat. No. 6,095,533, issued Aug. 1, 2000 to Balolia, and U.S. Pat. No. 5,940,932, issued Aug. 24, 1999 to LaHay, illustrate mobile base assemblies that may be connected to stationary power tools in order to mobilize the power tools. Although these wheel attachments have succeeded in making the tool more mobile, they do not allow the tool or tool housing to rest firmly on the floor once it has been moved into a desired position and often allow the tool to wobble due to movement permitted by the wheels, even when the wheels are locked.

In an attempt to address this concern, some cutting tools have been provided with lift mechanisms which are capable of raising the tool up onto wheels from an initial position wherein the tool is allowed to rest on its own legs. For example, U.S. Pat. No. 5,876,173, issued Mar. 2, 1999 to English, Jr., illustrates a lift dolly (10) for a contractor saw having a foot actuable lever (14) for lifting the saw up onto wheels (30) for mobility. Unfortunately, however, these lift mechanisms are incapable of lifting heavy power tools, such as cabinet saws, and are incapable of lifting power tools that do not have open stand bases, such as table saws with enclosed (or closed) bases.

Another shortcoming with existing cutting tools is that they lack internal storage space for holding equipment that may be used in conjunction with the cutting tool. This lack of storage space, often leads to the equipment being lost or misplaced and/or not readily available when needed. For example, many cutting tools are used in conjunction with a variety of saw blades, wrenches, table inserts, push sticks, miter gauges, and the like, which may be separated from the cutting tool and eventually lost.

To help operators in this regard, some tool manufacturers have provided separate storage compartments, such as cabinets, which can be attached to the cutting tool, the cutting tool stand, or table extension of the cutting tool. Unfortunately, however, these remote external storage compartments are often considered optional equipment that the operator must pay for in addition to the expense of the cutting tool itself. Most of these storage compartments also require separate assembly and attachment to the cutting tool which makes initial setup of the cutting tool longer and more burdensome on the operator. Lastly, these storage compartments may also be located some distance away from the cutting tool itself, such as cabinets attached to the end of the table extension; thereby, making it less likely that the operator will have the stored equipment readily available or on hand when needed.

Other cutting tool manufacturers have provided external storage compartments on the cutting tool itself, such as brackets and pockets extending from the exterior of the cutting tool for holding such things as fences, wrenches, owners' manuals, saw blades, etc. Unfortunately, however, these integral external storage compartments are exposed to the workshop environment and often collect sawdust and other airborne particles causing the storage compartments to fill up and making it harder to use the storage compartments for their intended purpose. In addition, existing cutting tools, with or without integral external storage compartments or remote external storage compartments, waste a large amount of interior space which is particularly problematic in smaller workshops where every bit of space is extremely valued.

Another shortcoming with existing cutting tools is that they fail to keep track of blade angles that may be routinely used by the operator. For example, traditional cutting tools provide a blade angle scale so that an operator can quickly adjust the saw blade to a desired position; however, they do not allow the operator to keep track of angles that have been repetitively used in order to assist the operator in returning the saw blade to such angles. This is particularly problematic when an operator has to adjust the angle of the saw blade multiple times during a project and wishes to return to at least one of the angles multiple times.

Another problem with conventional cutting tools is that the extensions that are provided with the table saw often take up a large amount of workshop space but provide little use outside of simply supporting workpieces that are being cut via the cutting tool. For example, conventional table extensions are often too delicate to be used for other workshop purposes. Existing table extensions also do not include many of the features that are needed in order to use the table extension for other workshop uses, such as, for example, as a workbench.

Accordingly, it has been determined that the need exists for an improved cutting tool and accessories therefor which overcomes the aforementioned limitations and which further provides capabilities, features and functions, not available in current devices.

BRIEF DESCRIPTION OF THE DRAWINGS

FIG. 4 is a perspective view of an alternate multipurpose spindle for the cutting tool of FIGS. 1A-F;

DESCRIPTION OF THE PREFERRED EMBODIMENTS

Figure 1A:
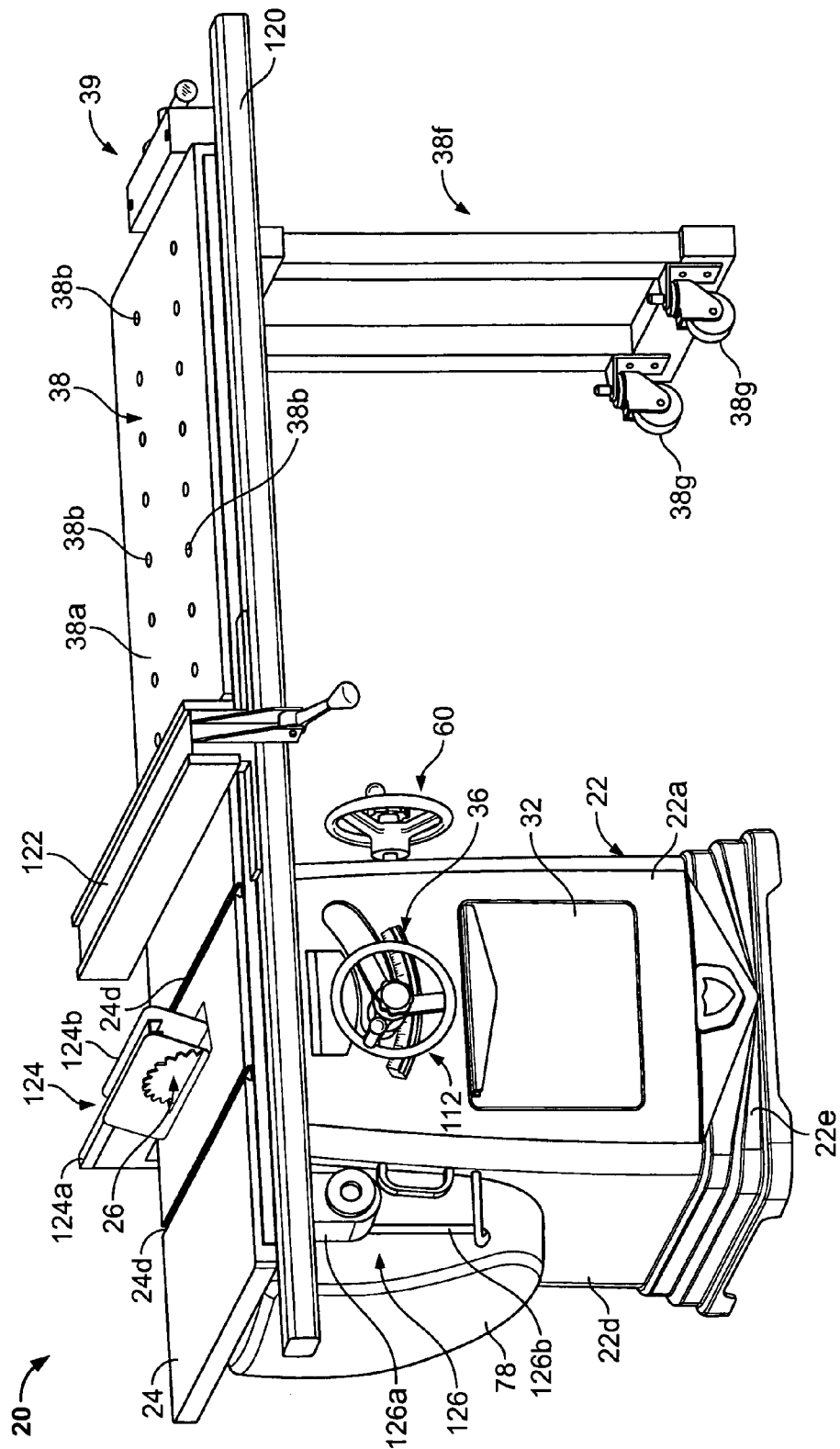
FIGS. 1A-F are perspective, front elevational, rear elevational, right side elevational, left side elevational and top plan views, respectively, of a cutting tool in accordance with the invention.
Figure 1B:
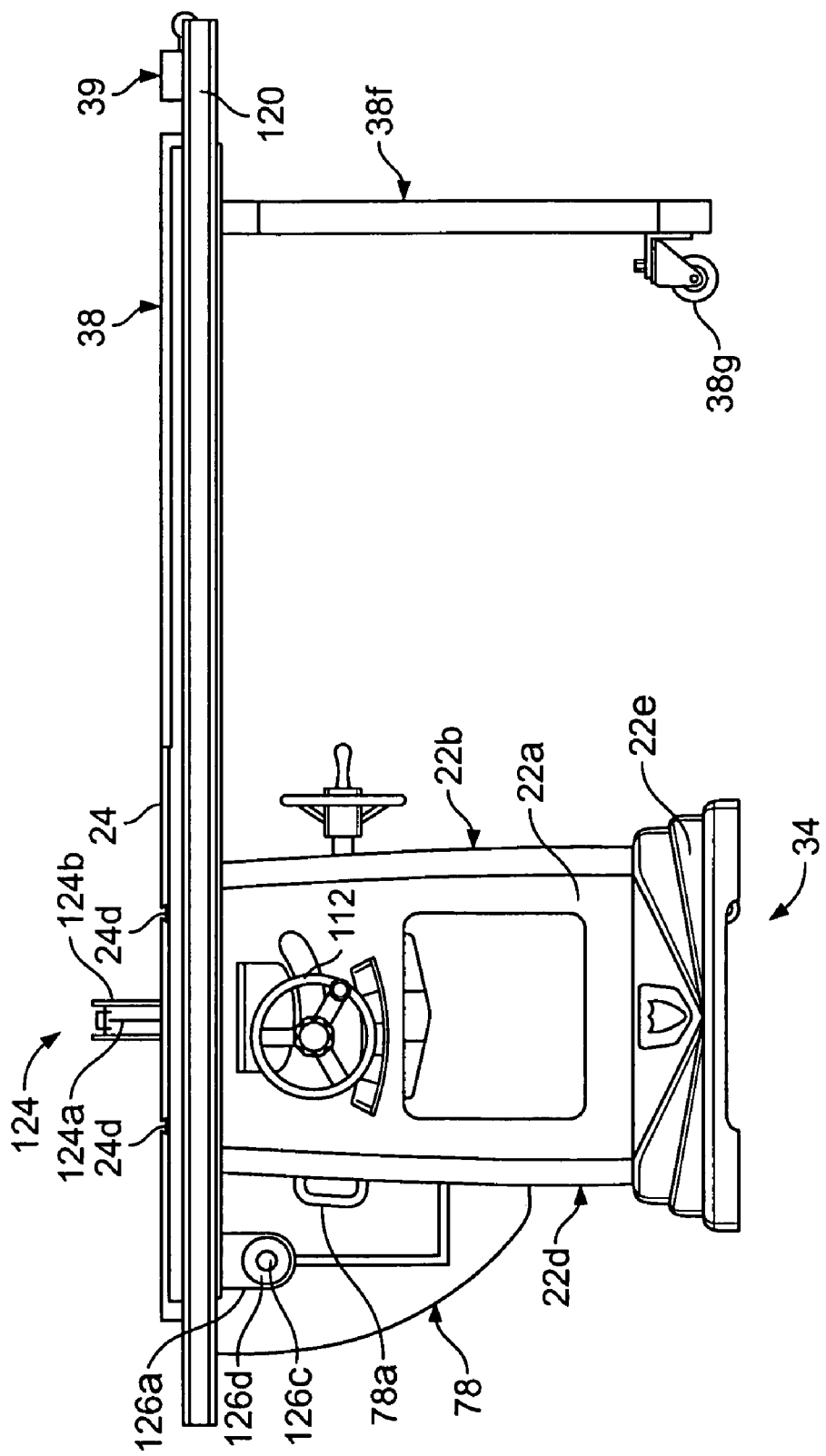
Figure 1C:
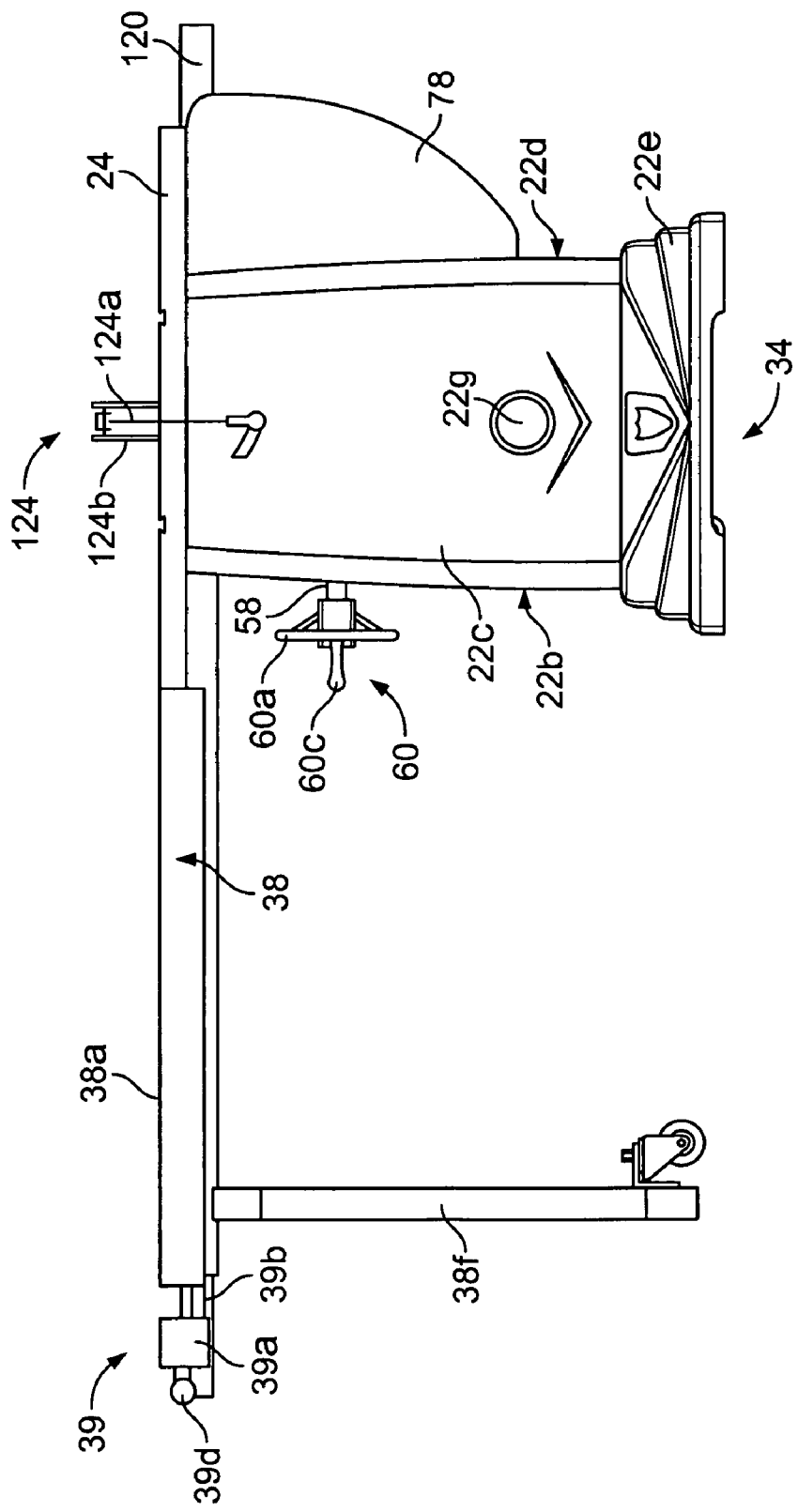
Figure 1D:
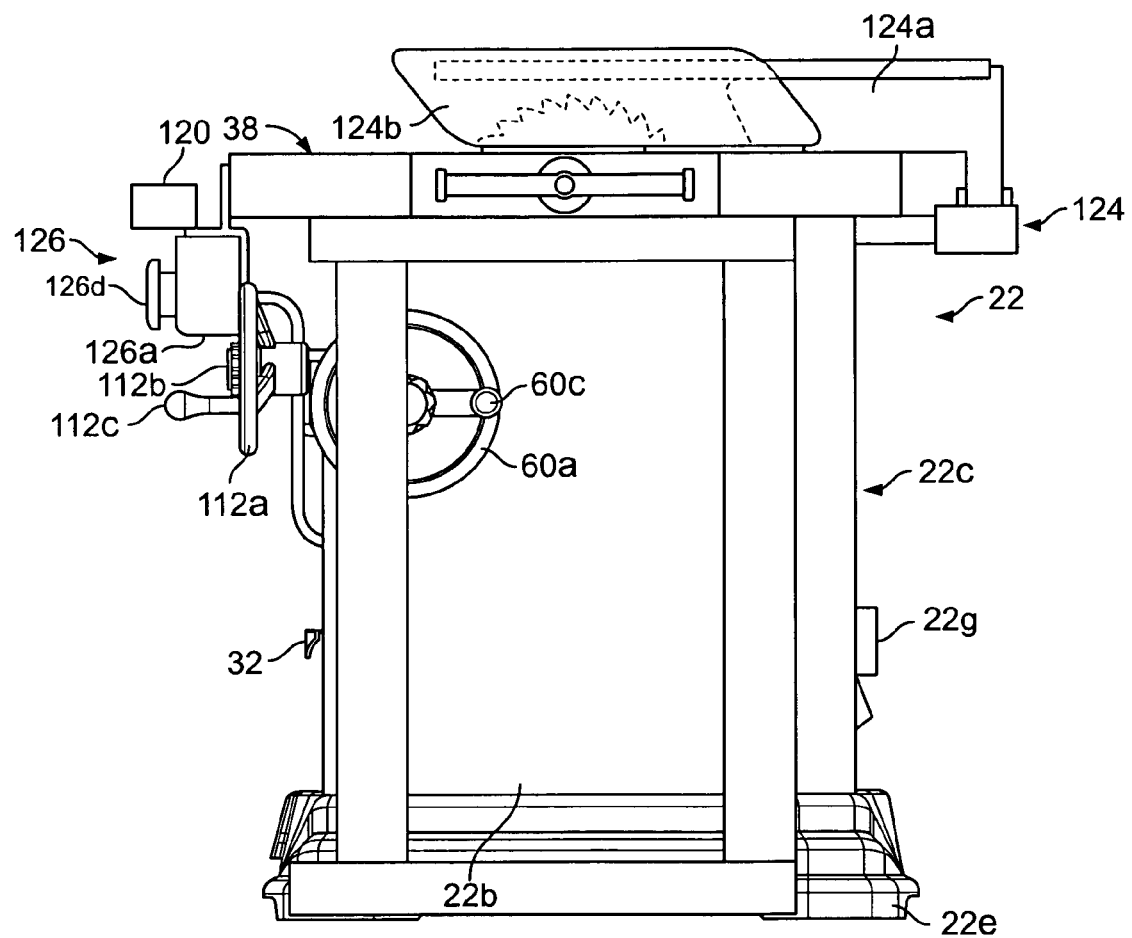
Figure 1E:
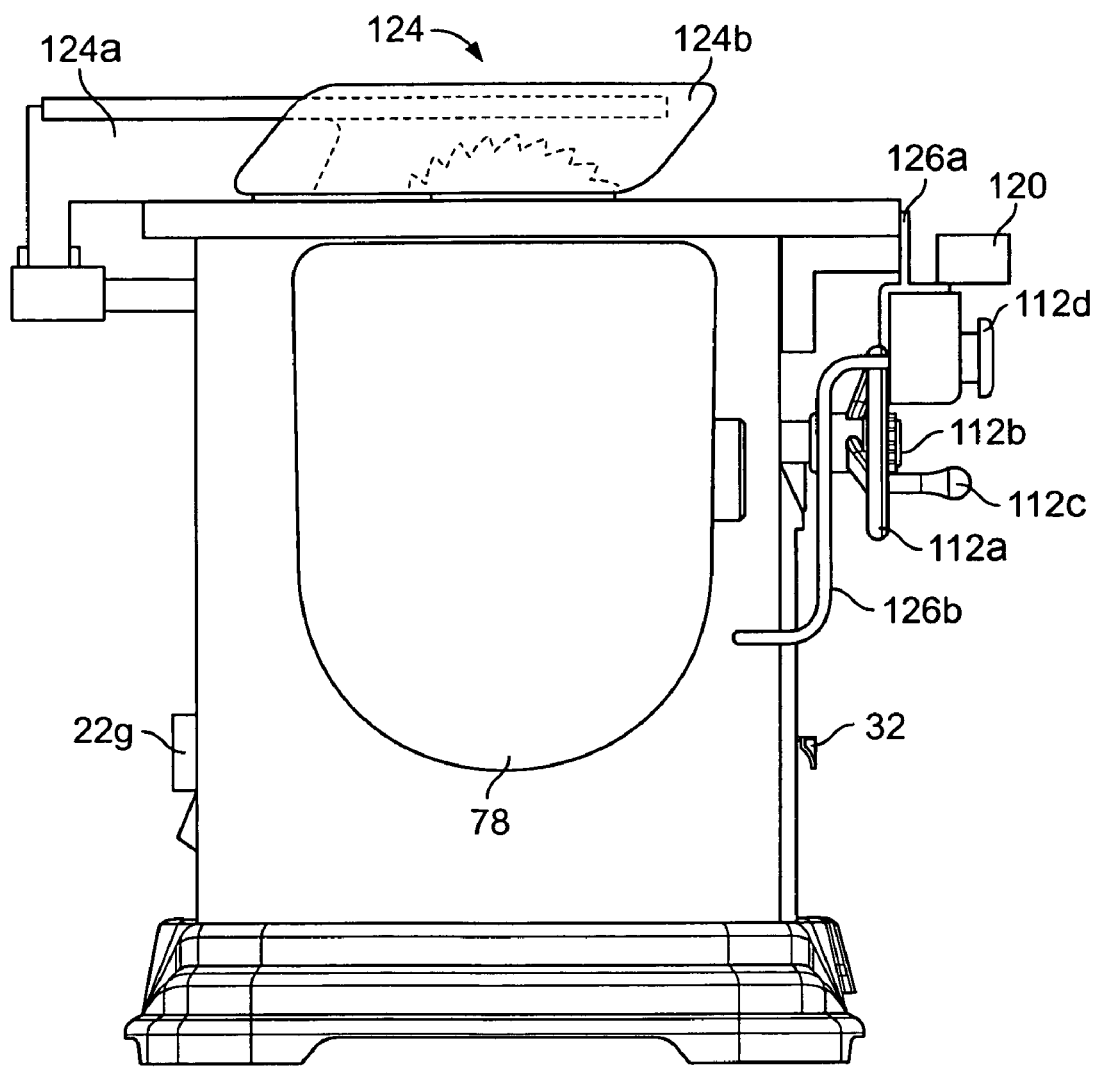
Figure 1F:
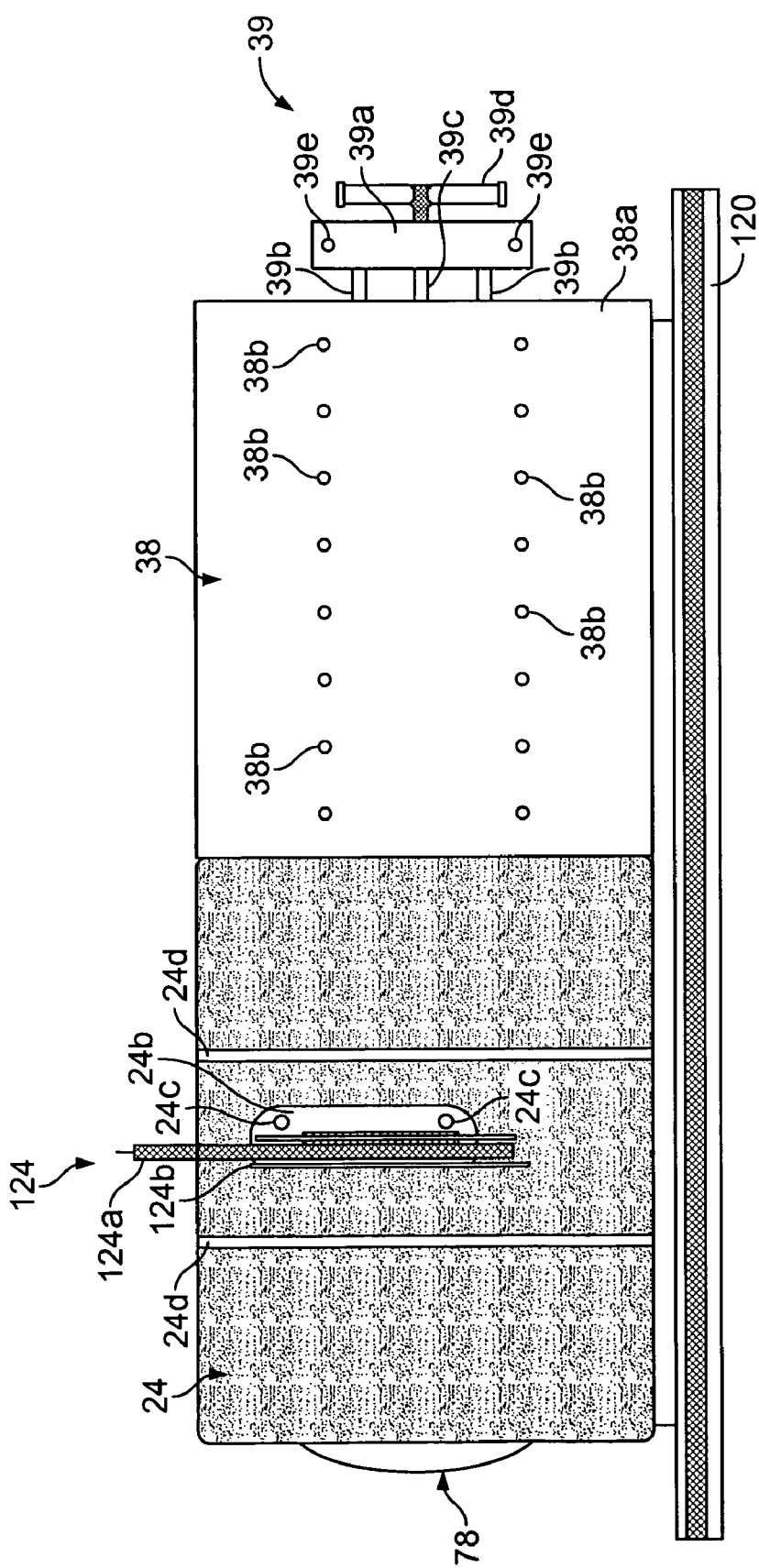

Turning now to the drawings, in which FIGS. 1A-F illustrate a cutting tool 20 in accordance with the invention, the cutting tool 20 includes a housing 22 with a generally flat work surface, such as table 24, upon which workpieces, such as wood or metal, may be set or rested. The table 24 defines an opening 24a through which a cutting implement, such as saw blade 26, may be disposed. In addition to the conventional components of a cutting tool, cutting tool 20 may also include an arbor lock 28 (FIGS. 7A-E), located within housing 22, for preventing the arbor 30 from rotating to assist an operator in installing, removing or replacing the saw blade 26. The cutting tool 20, may also include an internal storage compartment 32 for storing items or equipment, including those for use in connection with the cutting tool 20, an internal mobility system 34 to assist the operator in moving the cutting tool 20 when desired, and a cutting implement angle memory indicator 36 for aiding the operator in keeping track of a desired cutting implement angle. The cutting tool 20 may also be provided with an extension, such as table extension 38, which extends out from the housing 22 and has an upper surface that is generally coplanar with the upper surface of the table 24 so that the extension 38 can provide additional support to larger workpieces. In a preferred form, the table extension 38 will have a sturdy flat work surface, such as a wood workshop bench top, which the operator may use for a variety of workshop purposes in addition to simply supporting large workpieces that the cutting tool 20 is being used on. These and other concepts will be discussed in further detail below.

In the form illustrated, the cutting tool 20 is shown as a cabinet saw having all the equipment and features of conventional cabinet saws, including internal components such as a motor and trunnion assembly. It should be understood, however, that the cutting tool 20 may take the form of a variety of different saws, such as bench top table saws, free standing table saws, contractor saws, or the like, and may include any or all of the features of the invention discussed herein. In the cabinet saw 20 of FIGS. 1A-F, the housing 22 is preferably made of metal, such as steel, and includes front, right, rear and left side panels 22a-d, respectively, which define an inner cavity within which the cutting tool motor and trunnion assembly, dust collector and other equipment may be mounted, as will be discussed further below. The housing side panels 22a-d are connected to a base, such as skirt member 22e, upon which the apparatus may be rested. In a preferred form, the skirt member 22e will be made of cast iron and include ornamental ridges and indicia.

As illustrated in FIGS. 2A-F, the base 22e includes an internal mobility system 34 having wheel assemblies 34a which may be moved between an extended position (FIGS. 2C-D) wherein the cutting tool 20 rests on a portion of the wheel assemblies 34a and a retracted position (FIGS. 2E-F) wherein the cutting tool 20 rests on the base 22e of cutting tool 20. In the embodiment illustrated, the wheel assemblies 34a are moved between the extended and retracted positions via a drive system 34b. Each wheel assembly 34a includes a wheel member, such as castor 44, which is connected to a mounting body 46. The castors 44 will preferably consist of any conventional omni-directional wheel and will include ball bearings so that the operator can easily move and steer the cutting tool 20 when the castors 44 are in the extended position. The mounting body 46 of each wheel assembly further defines an aperture, such as threaded bore 46a, which extends through the center of the body 46 and is connected to corner bracket 22f of base 22e via fasteners, such as shoulder bolts 46b. In the form illustrated, the shoulder bolts are disposed in bores defined by the corner bracket 22f, which allow the shoulder bolts 46b (and mounting body 46 connected thereto) to move linearly with respect to the corner bracket 22f (e.g., up and down, toward and away from the corner bracket 22f).

The drive system 34b preferably includes a drive shaft 40 having first and second ends 40a and 40b, respectively. The first end 40a of drive shaft 40 is connected to a first gear 42 for mating with an actuating gear 48 which will be discussed further below. The second end 40b is connected to a second gear, such as primary sprocket 50a, which rotates along with the drive shaft 40 when drive shaft 40 is driven by actuating gear 48.

The drive shaft 40 and primary sprocket 50a are rotatably mounted to corner bracket 22f of base 22e and are further connected to a secondary drive member, such as lead screw 52a, which rotates in unison with the drive shaft 40 and socket 44a. Thus, rotation of the drive shaft 40 via first gear 42 results in a corresponding rotation of primary sprocket 50a and lead screw 52a. The lead screw 52a is threadedly connected to the bore 46a of mounting body 46, however, the shoulder bolts 46b of mounting body 46 prevent the mounting body 46 from axially rotating along with the lead screw 52a. Thus, depending on the direction of rotation of lead screw 52a, the mounting body 46 will either be raised or lowered via the threaded engagement between lead screw 52a and bore 46a of mounting body 46, thereby causing the castor 44 to raise or lower and moving the mobility system between its retracted or extended positions, respectively. More particularly, when the mobility system 34 is placed in the extended position (FIGS. 2C-D), the wheels 44 extend down below the bottom surface of housing base 22e, and when the mobility system 34 is placed in the retracted position (FIGS. 2E-F), the wheels 44 are retracted into the housing 22 and are maintained at a position above the plane containing the bottom surface of housing base 22e to ensure that the cutting tool 20 rests firmly on its own housing 22.

In the embodiment illustrated, the primary sprocket 50a is connected to second, third and fourth sprockets 50b-d via a drive member, such as drive chain or transfer chain 54. Each of the second, third and fourth sprockets 50b-d are connected in similar fashion to lead screws 52b-d, respectively. Thus, the rotation of primary sprocket 50a and lead screw 52a cause corresponding rotations of the second, third and fourth sprockets and lead screws, 50b-d and 52b-d, respectively. The net effect of the rotation of sprockets 50a-d and lead screws 52a-d causes the castors 44 of the wheel assemblies 34a to be moved in unison between extended and retracted positions.

Figure 2A:
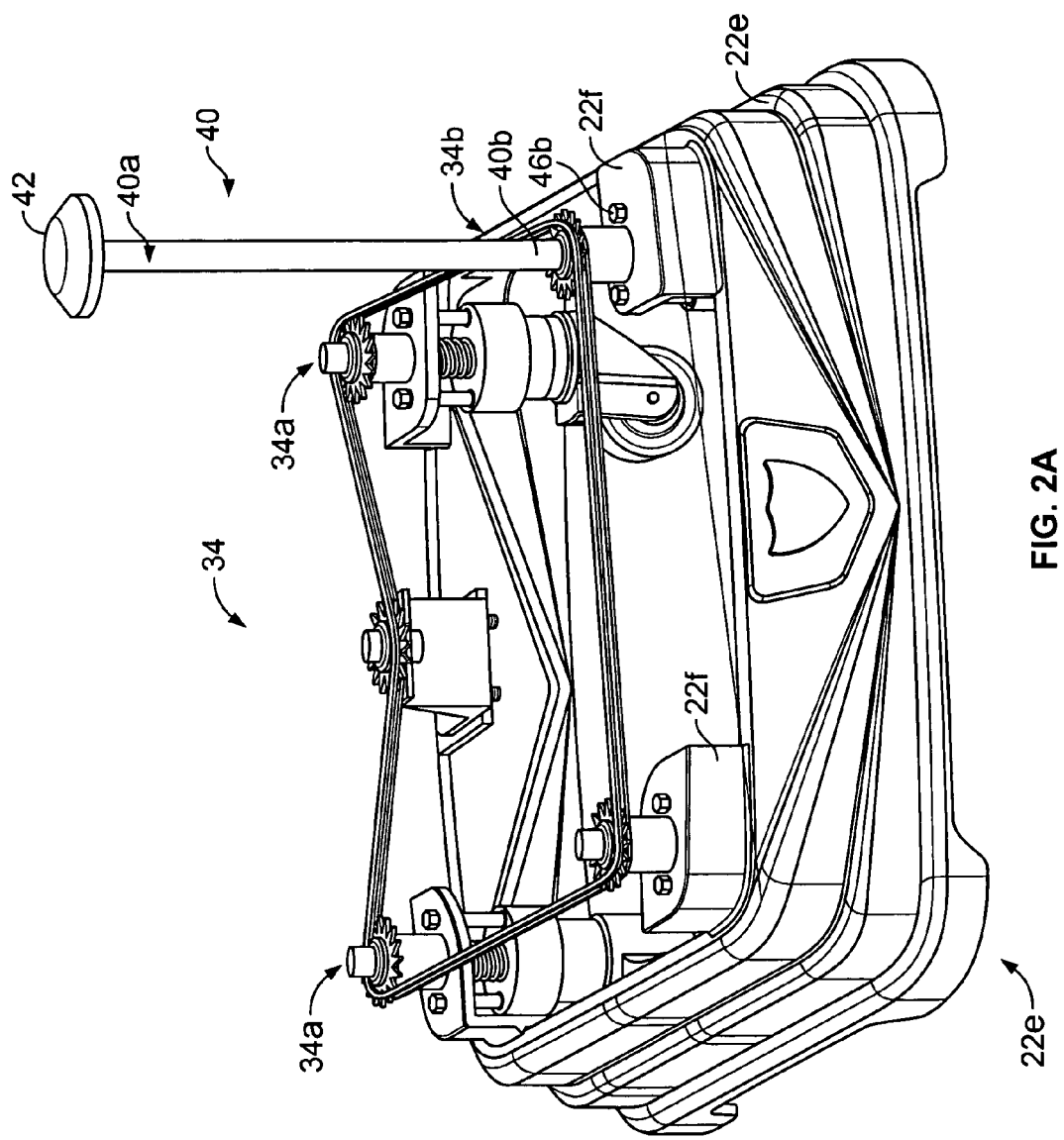
FIG. 2A is a partial perspective view of the internal mobility system of the cutting tool of FIGS. 1A-F.
Figure 2B:
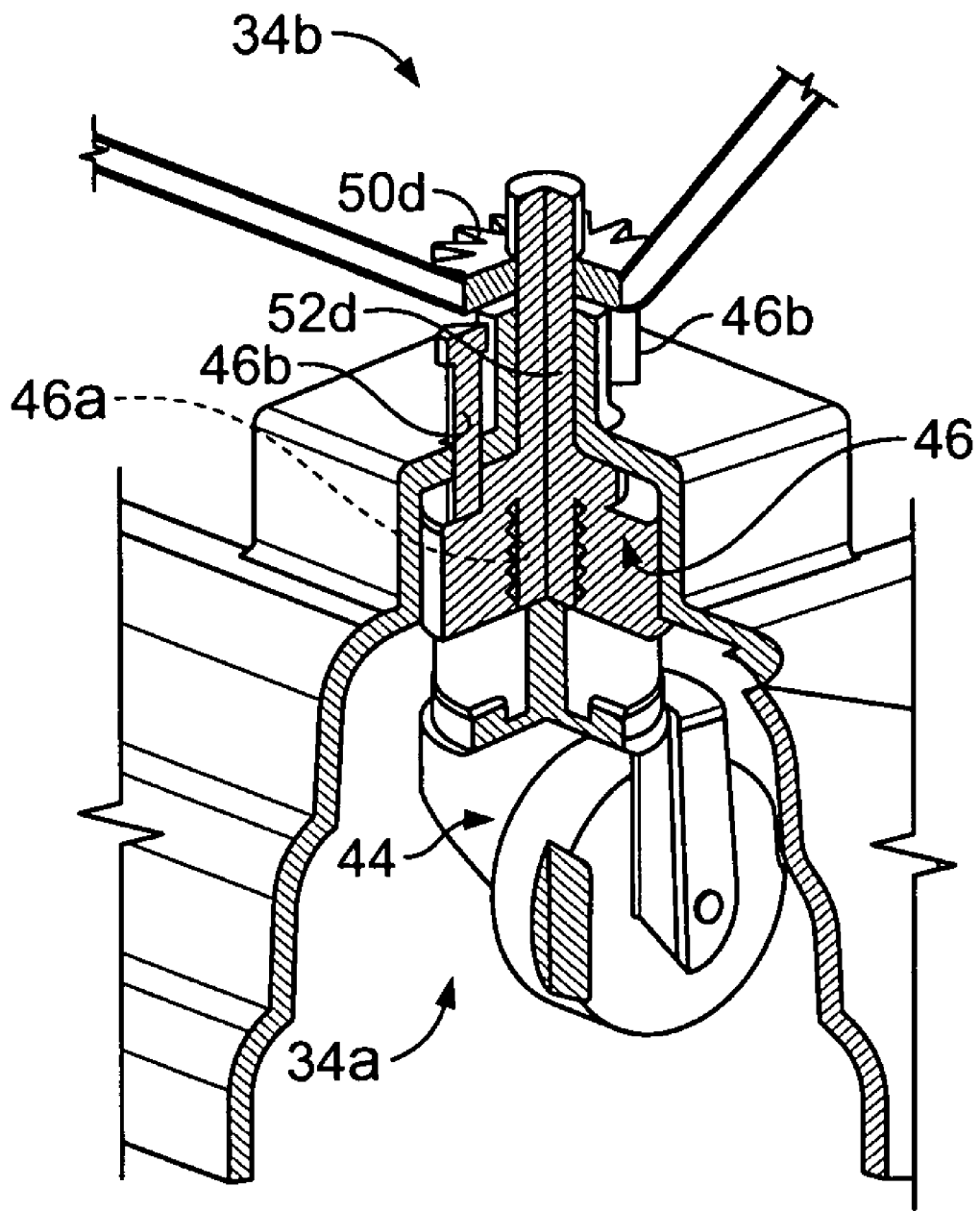
FIG. 2B is an enlarged, cut away, view of one of the wheel and drive assemblies of the internal mobility system of FIG. 2A, showing the wheel member in its retracted position.
Figure 2C:
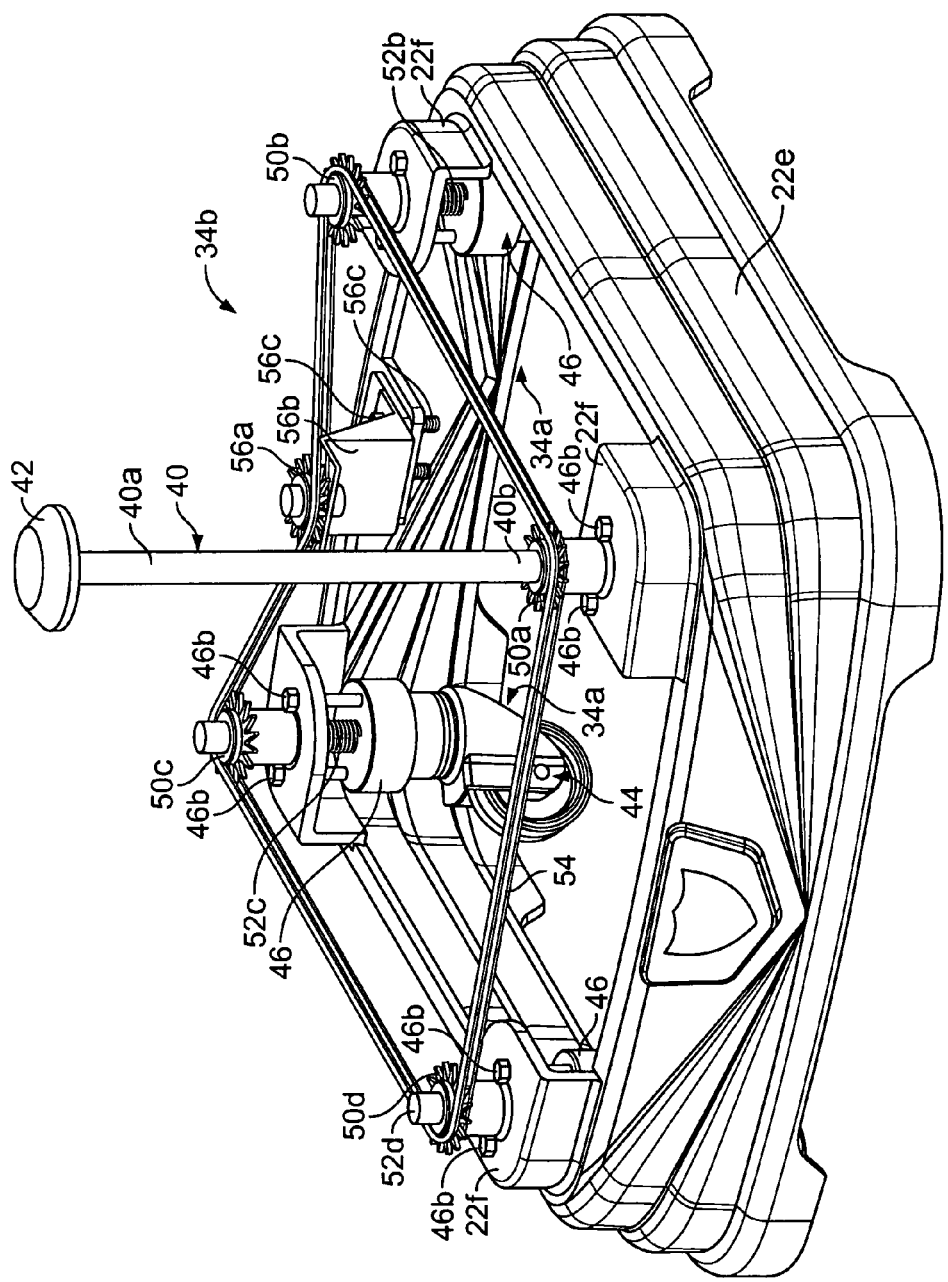
FIGS. 2C-D are perspective and front elevational views of the internal mobility system of FIG. 2A showing the wheel members in their extended position.
Figure 2D:
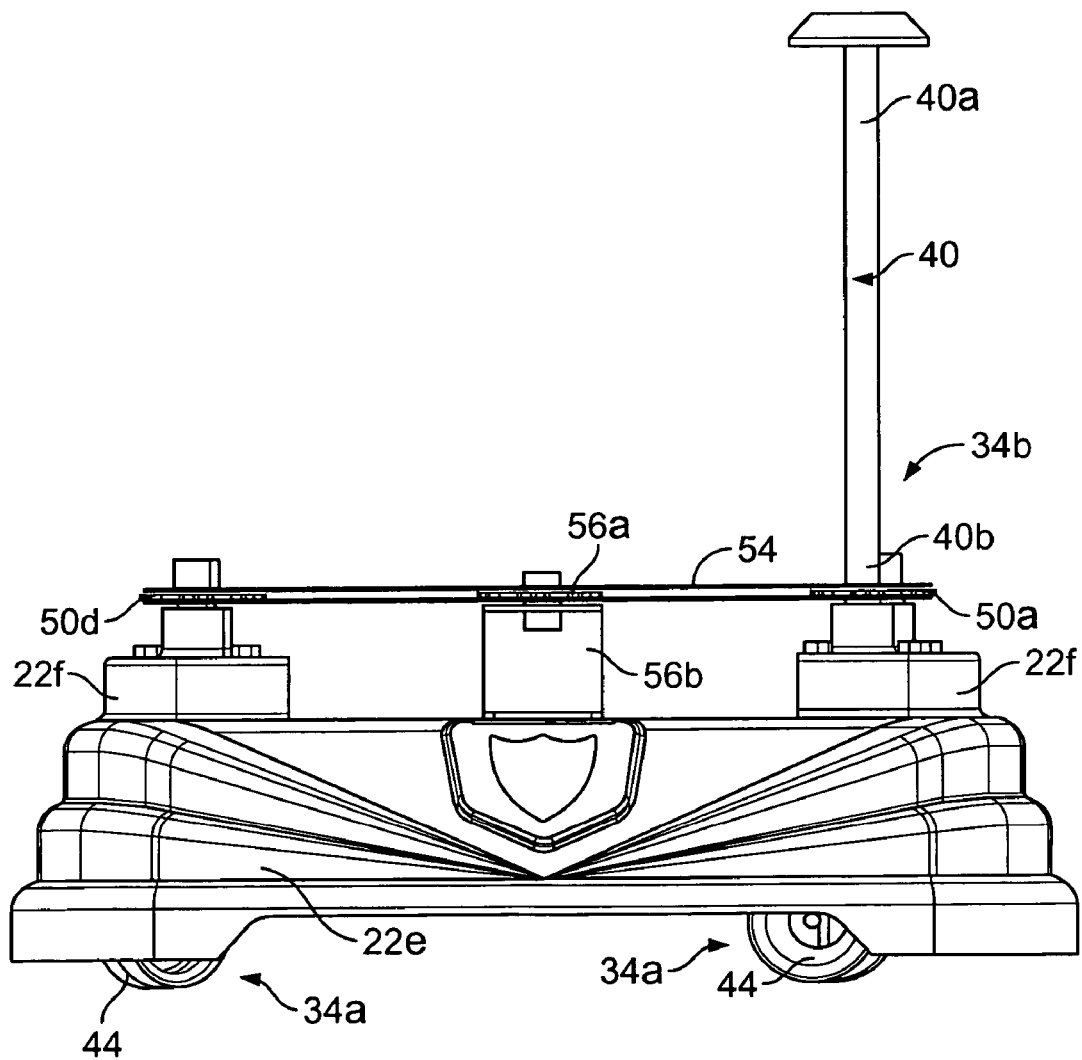
Figure 2E:
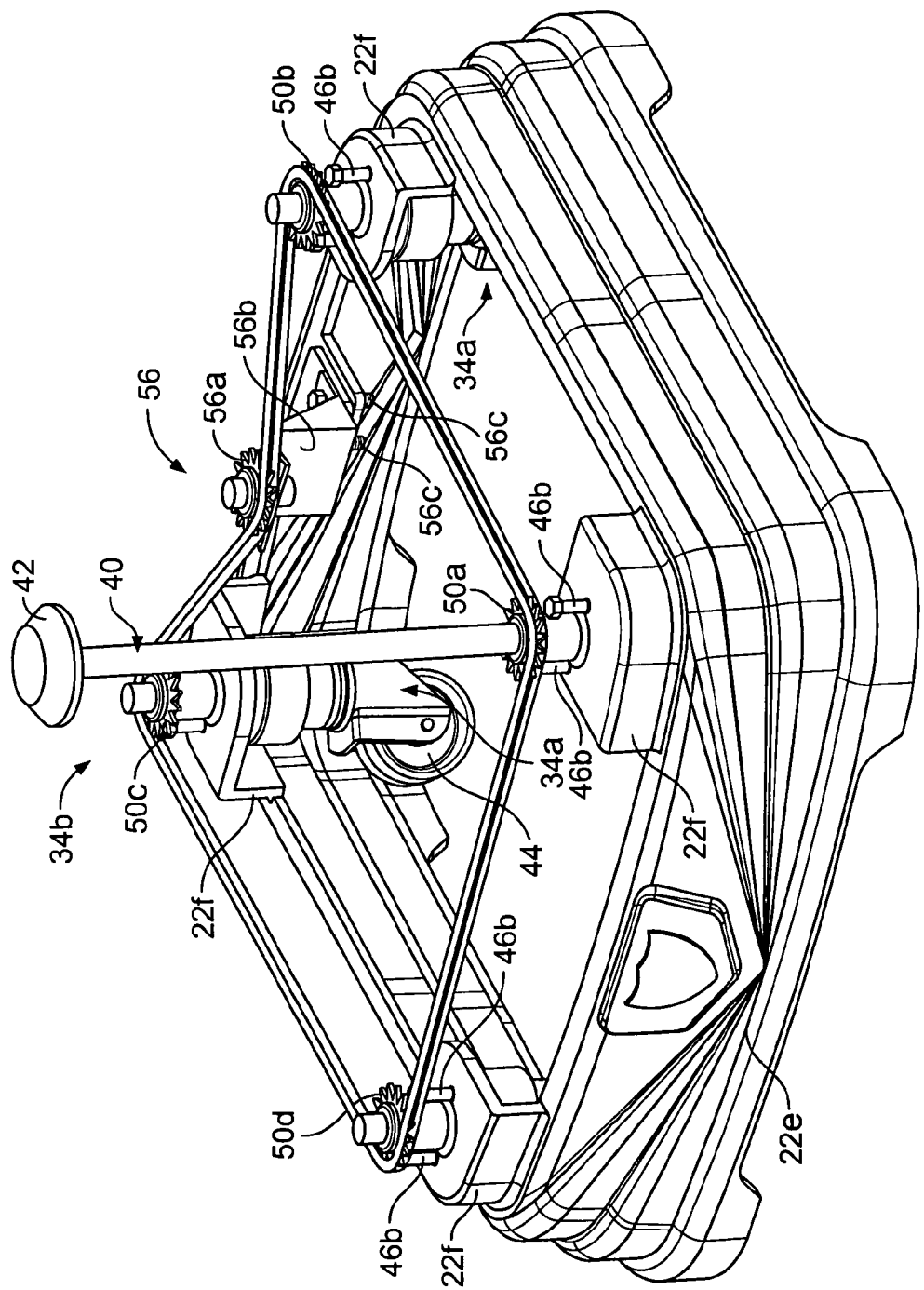
FIGS. 2E-F are perspective and front elevational views of the internal mobility system of FIG. 2A showing the wheel members in their retracted position.
Figure 2F:
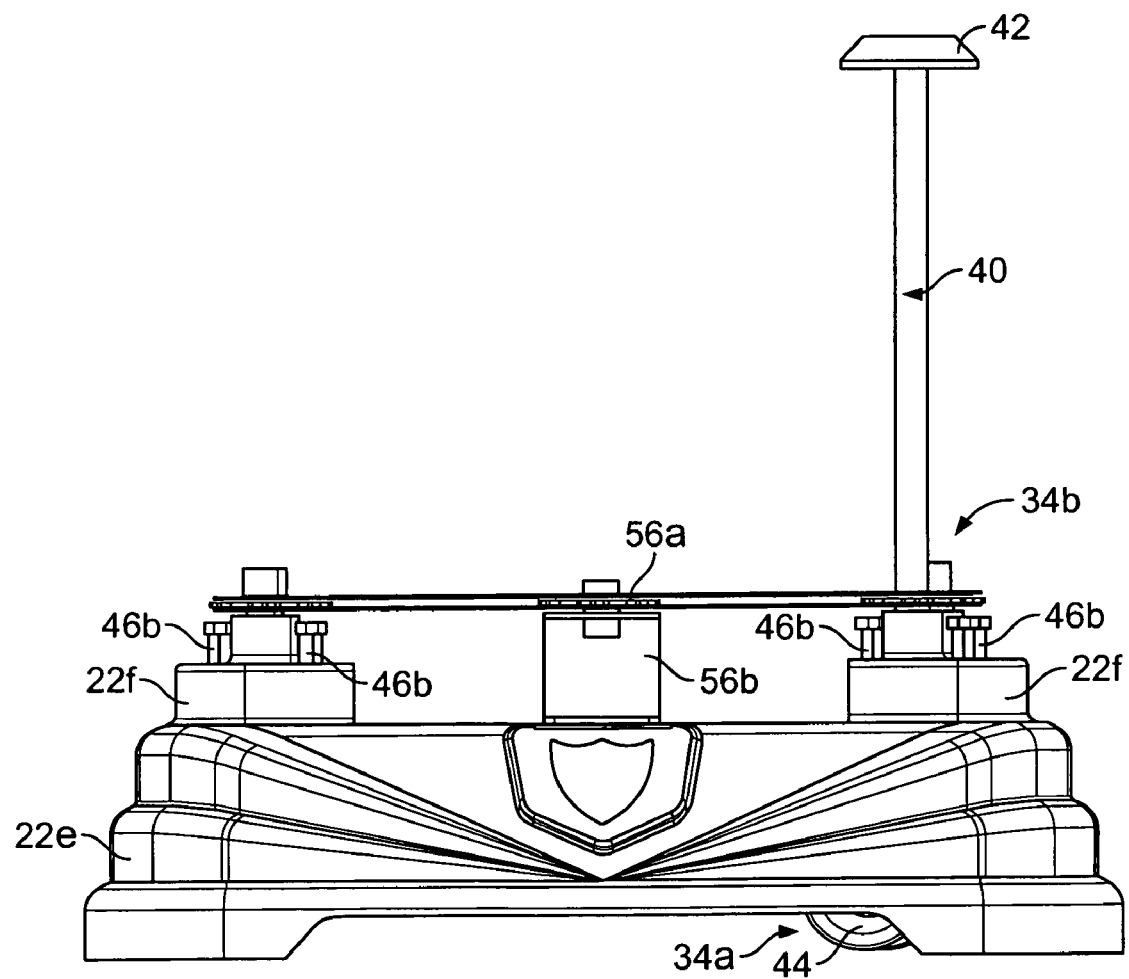
Figure 3A:
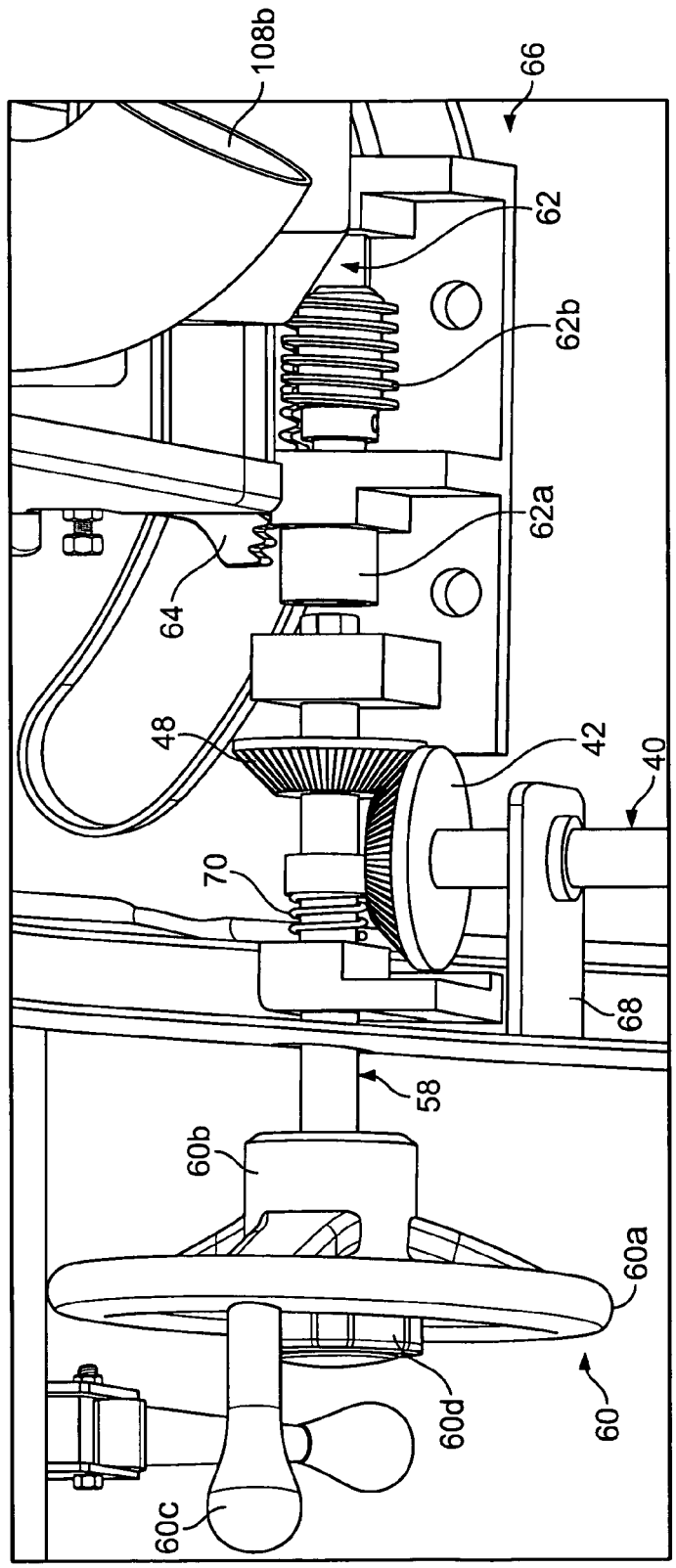
FIG. 3A is an enlarged, cut away, view of the multipurpose spindle of the cutting tool of FIGS. 1A-F, showing the spindle in the mobile base actuating position.
Figure 3B:
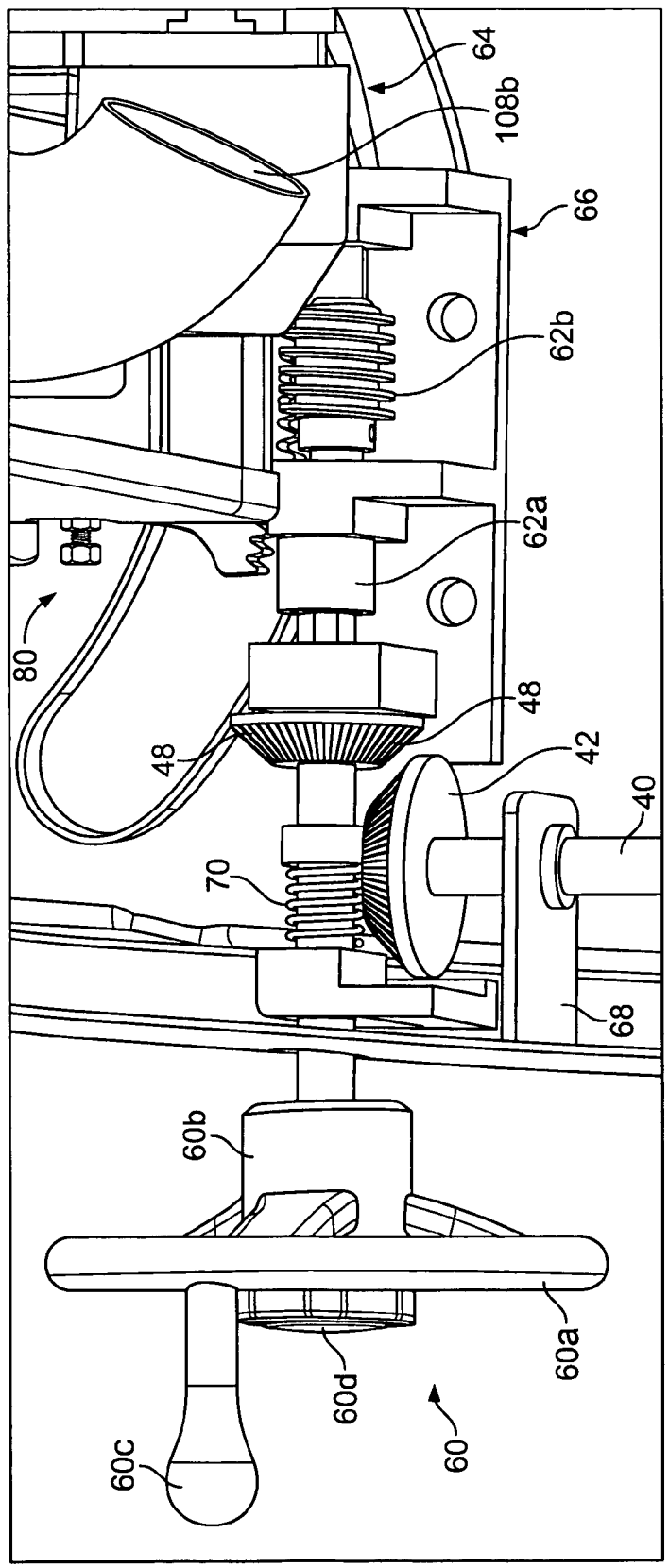
FIG. 3B is an enlarged, cut away, view of the multipurpose spindle of FIG. 3A, showing the spindle in the blade adjusting position.
Figure 3C:
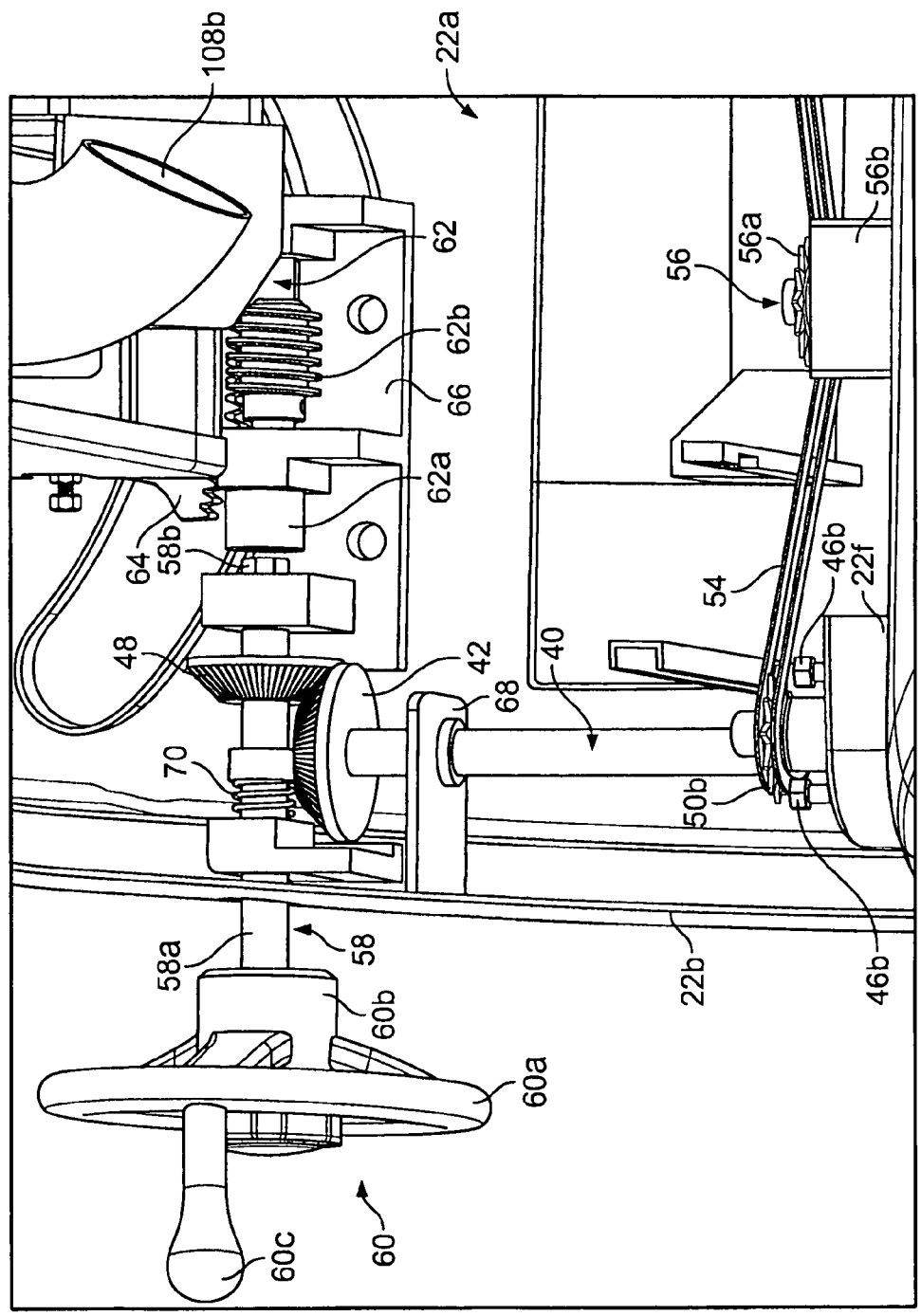
FIGS. 3C-D are enlarged, cut away, views of the multipurpose spindle of FIG. 3A, showing the spindle in the mobile base actuating position and the blade adjusting position, respectively.
Figure 3D:
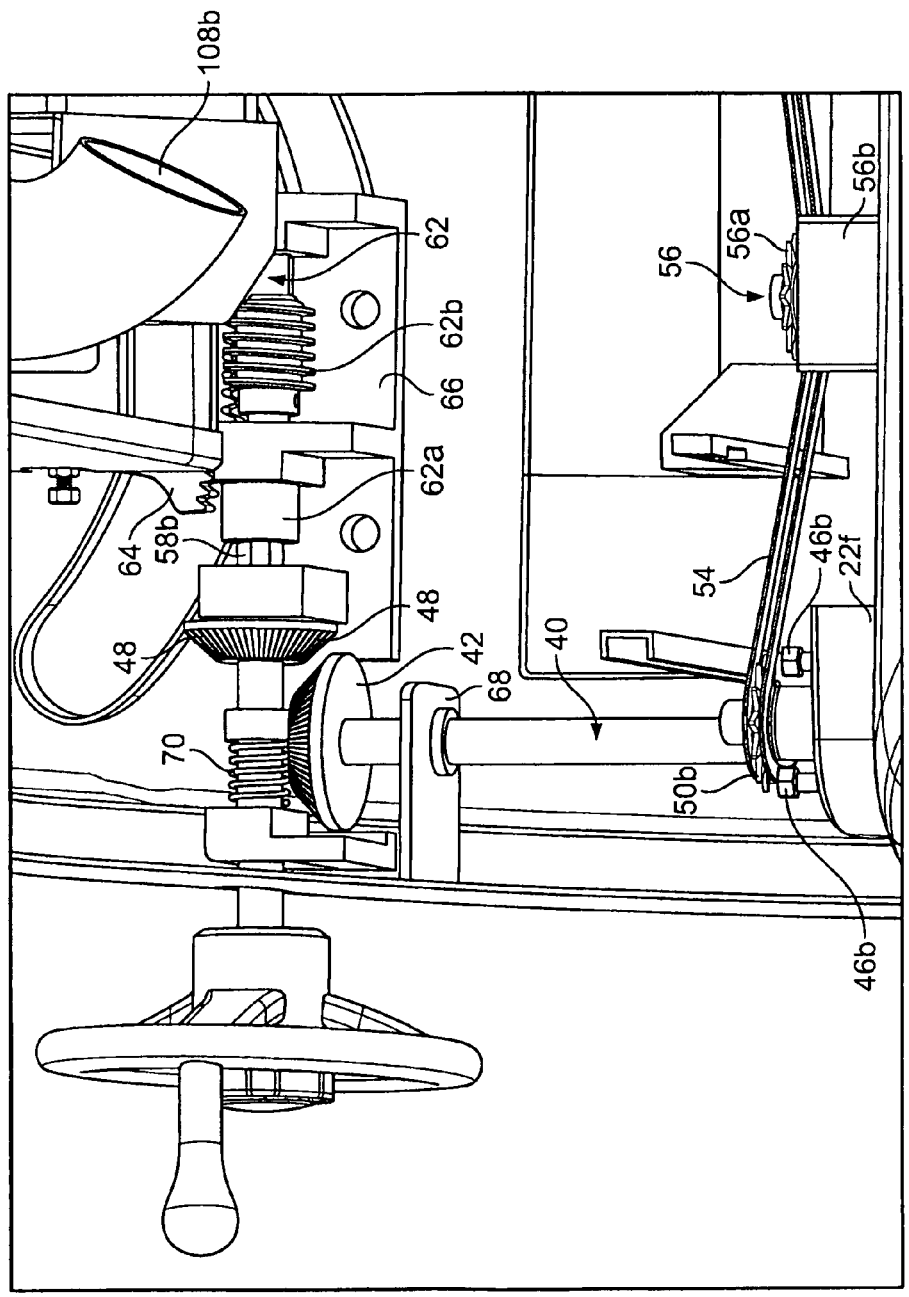
Figure 5A:
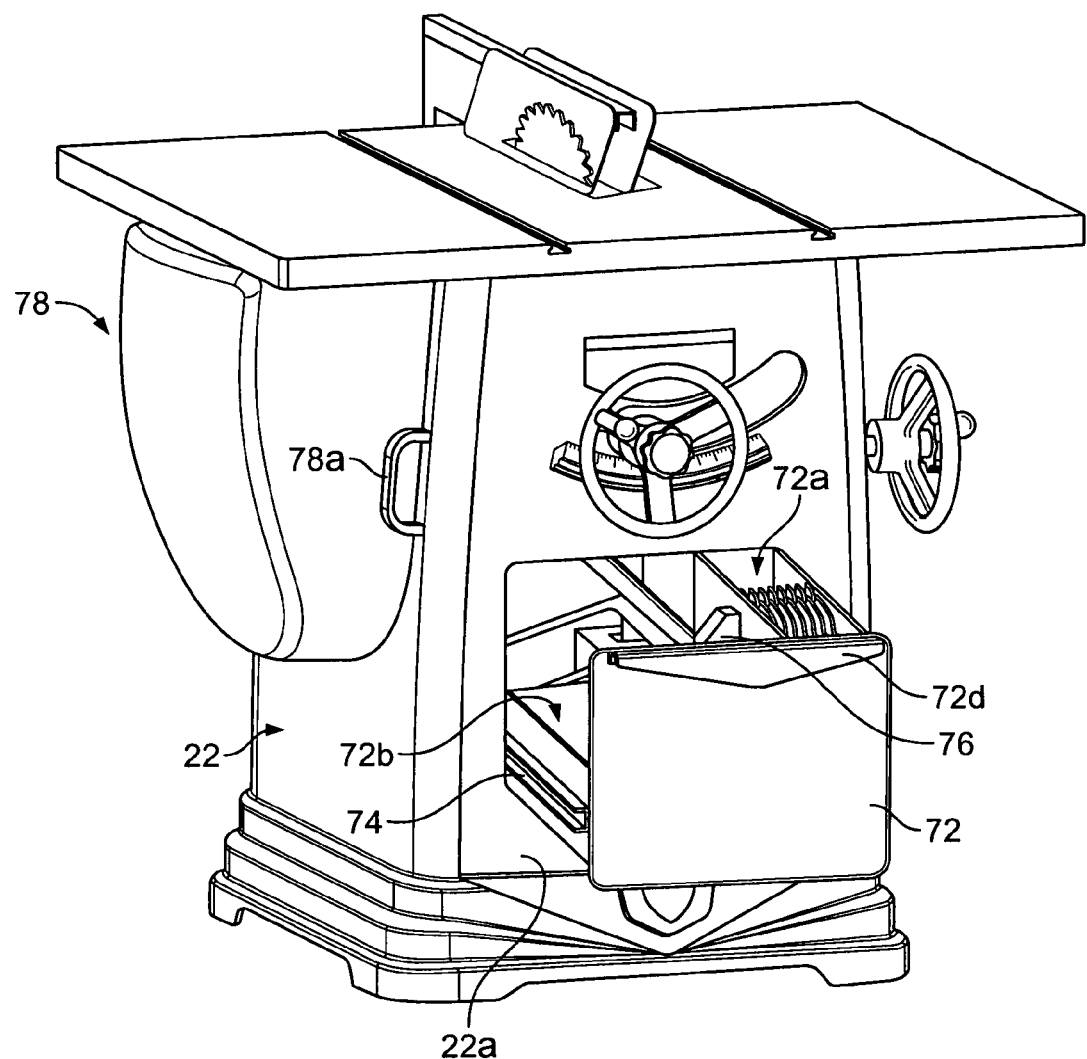
FIG. 5A is a perspective view of the internal storage system of the cutting tool of FIGS. 1A-F, as viewed from the front of the cutting tool and showing the drawer in its open position.
Figure 5B:
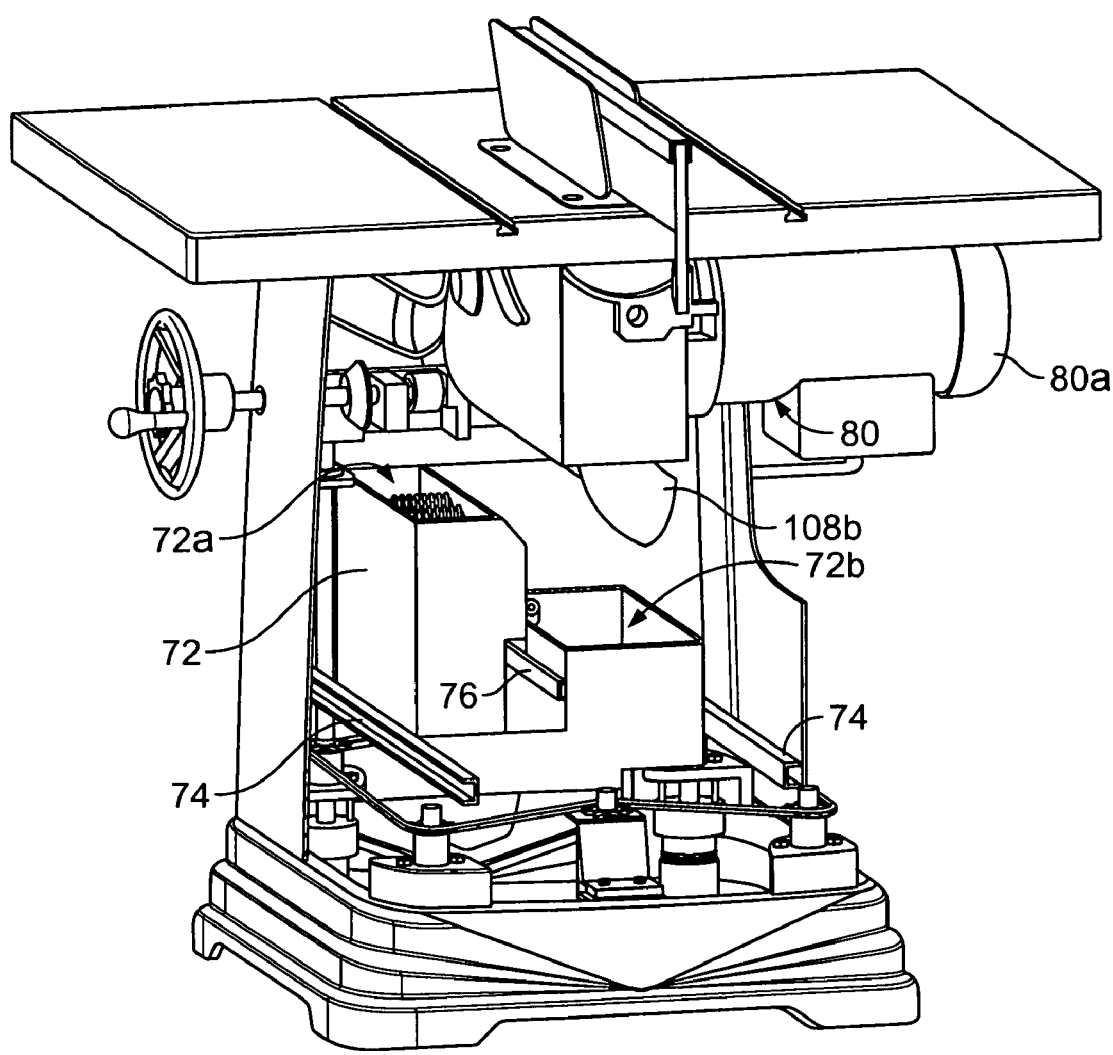
FIG. 5B is a perspective, cut away, view of the internal storage system of FIG. 5A, as viewed from the rear of the cutting tool and showing the drawer in its closed position.
Figure 5C:
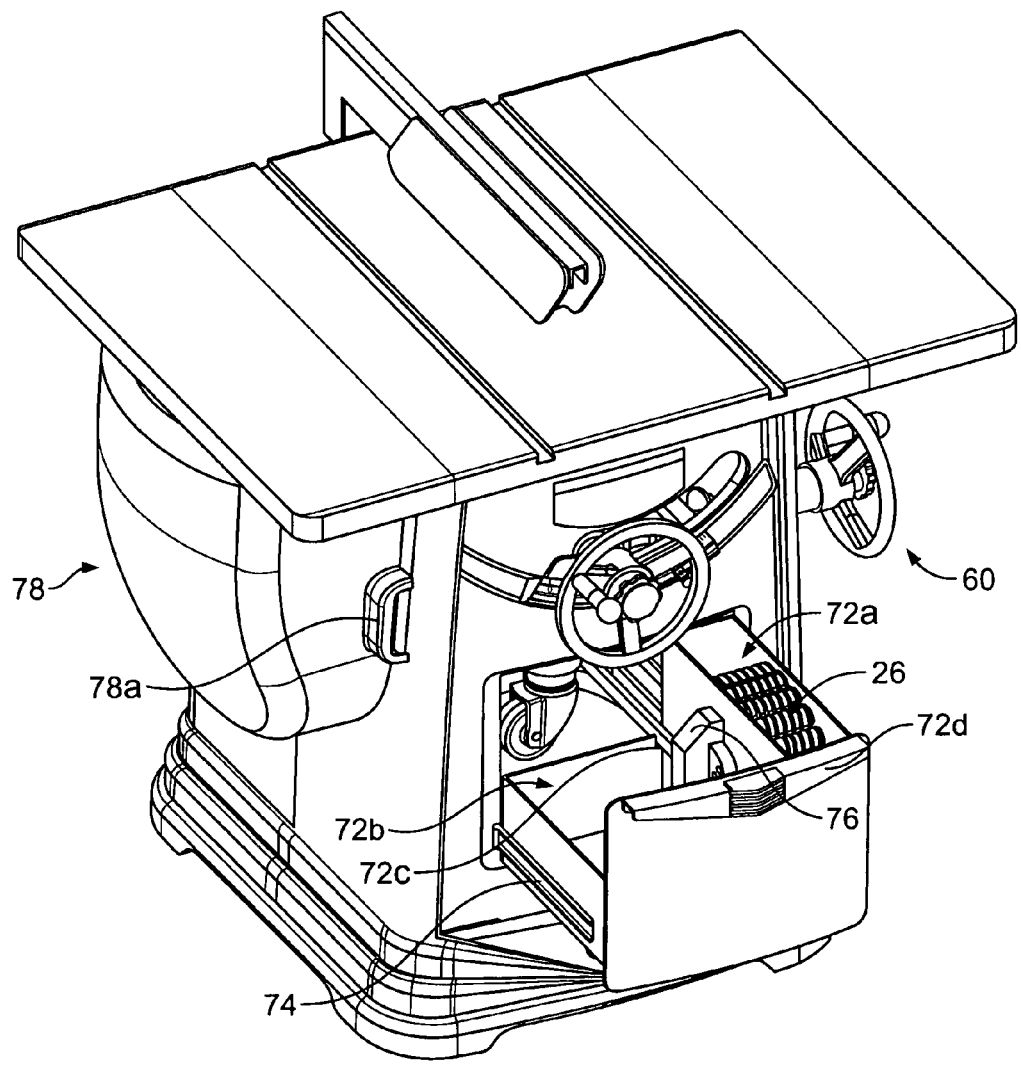
FIGS. 5C-D are perspective and side elevational views of the internal storage system of FIG. 5A, showing the drawer in its open position.
Figure 5D:
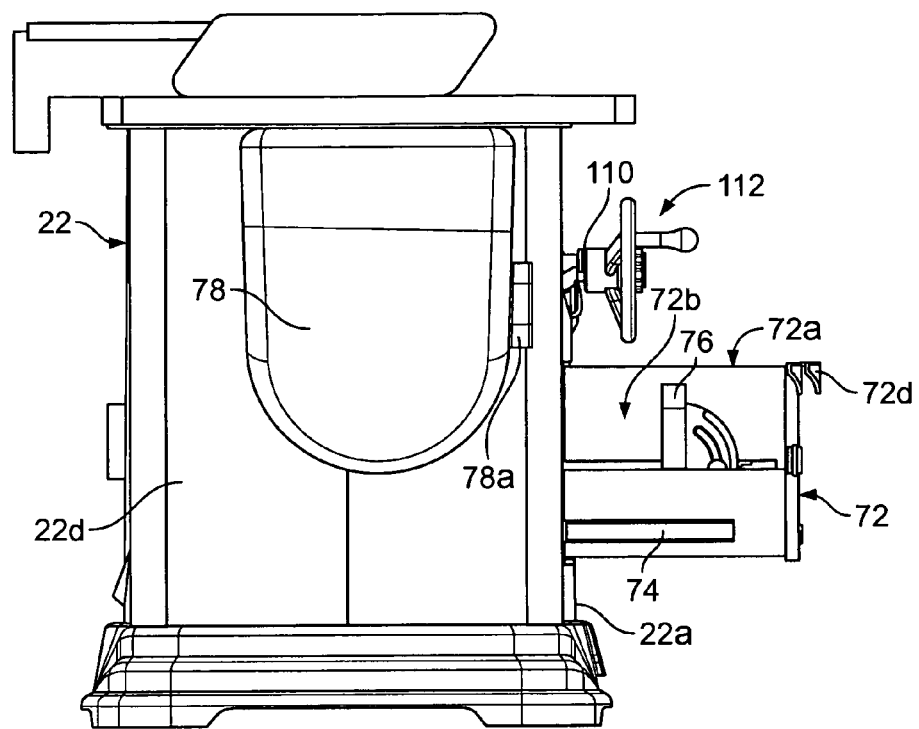
Figure 6:
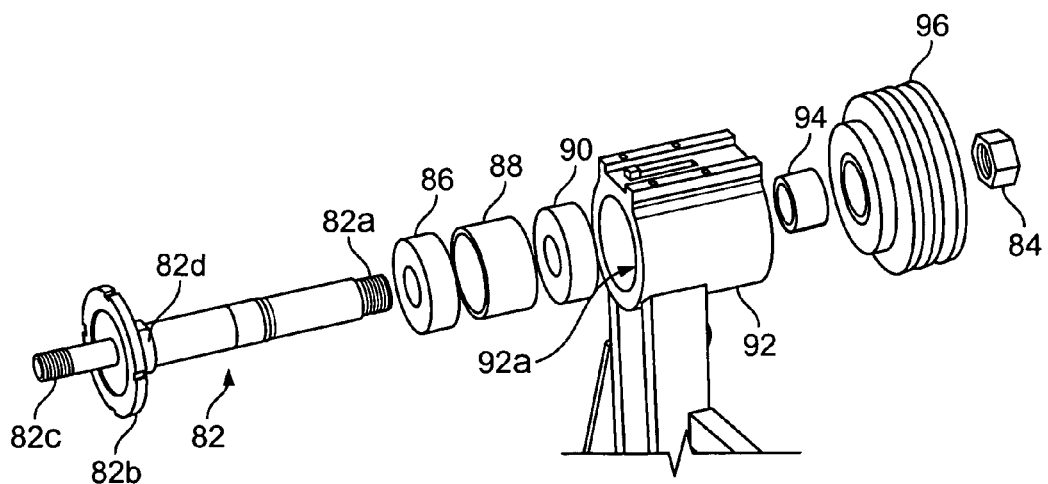
FIG. 6 is an exploded view of the arbor of the cutting tool of FIGS. 1A-F.

In the embodiment illustrated in FIG. 2B, the inner shaft of the threaded bore 46a may have at least one straight edge. One of the threaded bore area and lead screw 52d will define a protrusion and the other will define a mating recess for receiving at least a portion of the protrusion to connect the mounting body 46 to lead screw 52d. The mating ends may both contain at least one straight edge to complement one another.

When the castors 44 are in the extended position (FIGS. 2C-D), the cutting tool rests on the wheels of the mobility system 34, and when the castors 44 are in the retracted position (FIGS. 2E-F), the cutting tool 20 rests firmly or sturdily on the base 22e of the cutting tool 20, rather than on the wheels 44. This configuration allows the cutting tool to rest firmly on the floor of a workshop and prevents the wobble that is often associated with tools resting on the wheels of their mobile bases. In addition, this configuration also allows the mobility system 34 to be used with heavy tools, such as cabinet saws, and with tools that have an enclosed base.

When the mobility system is moved toward its extended position, the heads of shoulder bolts 46b will eventually abut the upper surfaces of the corner brackets 22f, thereby signifying that a limit of travel has been reached and preventing the mobility system 34, and in particular casters 44, from being lowered any further. Conversely, when the mobility system 34 is moved toward its retracted position, the main body of the mounting plate 46 will eventually abut the lower surfaces of corner brackets 22f, thereby signifying that the opposite limit of travel has been reached and preventing the mobility system 34, and in particular the casters 44, from being raised any further.

Although specific limits of travel have been illustrated in FIGS. 2A-F and specific clearances have been shown, it should be understood that in alternate embodiments the mobility system 34 may be provided in a variety of configurations to allow any limit of travel or wheel clearance that may be desired. For example, a spacer may be positioned between the caster 44 and the mounting plate 46 in order to ensure that the casters 44 lower to a desired position to ensure that the cutting tool 20 will be raised a sufficient amount in order to be moved easily across a workshop floor. In yet other embodiments, the length of the screw drives 52a-d and shoulder bolts 46b may be adjusted to provide as little or as much movement of the wheels 44 as is desired by the operator.

The mobility system 34 may also be provided with a tensioning mechanism 56 in order to remove any slack in the drive chain 54. In the embodiment illustrated, the tensioning mechanism 56 includes a fifth sprocket 56a to which the drive chain 54 is connected. The tensioning sprocket 56a is rotatably connected to an arm 56b which is adjustable with respect to the base 22e so that the tension in the drive chain 54 may be adjusted as desired. More particularly, the arm 56b defines at least one elongated slot through which a fastener, such as bolt 56c, is disposed in order to secure the arm 56b to the base 22e. The slot allows the arm 56b to be secured to the base in a variety of positions to adjust the tension of the drive chain 54. In the form illustrated, the arm 56b actually defines two elongated slots into which two separate bolts 56c are inserted. The bolts are then passed through corresponding openings in the base 22e and nuts are connected and tightened in order to secure the arm 56b to the base 22e. The use of two separate bolts 56c prevents the arm 56b from rotating with respect to the base 22e and helps prevent the arm 56b from slipping once the desired drive chain tension has been set.

In the form illustrated, the operator may increase the tension in the drive chain by linearly sliding the arm 56b (and sprocket 56a connected thereto) further in towards the center of the base 22e. Conversely, the operator may reduce the tension in the drive chain by sliding the arm (and sprocket 56a) away from the center of base 22e or out toward the perimeter of the base 22e. Once the desired tension has been set, the operator may move the mobilization system 34 between its extended and retracted positions by rotating the drive shaft 40 and primary sprocket 50a connected thereto, which in turn will cause corresponding movements in the second, third and fourth sprockets 50b-d, respectively, as well as in the tensioning sprocket 56a. It should be understood, however, that a variety of different tension mechanisms may be used in alternate embodiments of cutting tool 20. For example, in one form, the tensioning mechanism may utilize a cam member for adjusting the tension of a drive chain or belt. In another embodiment, the drive chain may be designed with links that may be removed or added in order to adjust the tension of the drive chain.

As illustrated in FIGS. 3A-D, the drive system 34b is actuated via an actuating gear 48. In a preferred form, the actuating gear 48 is connected to a shaft, such as spindle 58, and is movable between a first position wherein the actuating gear 48 engages the drive shaft gear 42, and a second position wherein the actuating gear is spaced apart from (or disengaged from) drive shaft gear 42, or vice versa. The spindle 58 has first and second ends 58a and 58b, respectively, and the actuating gear 48 is mounted or fixed to the spindle 58 between the first and second ends 58a-b. Thus, the actuating gear 48 is movable between the first and second positions discussed above by moving the spindle 58 between corresponding first and second positions. For example, the spindle 58 is movable between a first position wherein the actuating gear 48 engages the drive shaft gear 42, and a second position wherein the actuating gear is spaced apart from (or disengaged from) drive shaft gear 42.

In the embodiment illustrated, the first end 58a of spindle 58 extends out of housing 22 and is connected to an actuator, such as handle 60. The handle 60 is a hand wheel having a ring shaped gripping portion 60a that extends out from and is connected to a center hub 60b. In a preferred form, the hand wheel 60 also includes a post shaped gripping portion 60c extending out from the ring 60a to provide the operator with options for gripping and actuating wheel 60. For example, the operator may use the ring 60a or post 60c, or a combination of both, to actuate the spindle 58. The post 60c is connected to the ring 60a via a fastener, such as a screw, and the ring 60a and hub 60b are connected to the spindle end 58a via a fastener such as nut or knob 60d.

It should be understood that other actuators may be used to move the internal retractable mobile base between extended and retracted positions. For example, a lever may be used.

The second end 58b of spindle 58 has a structure for mating with another shaft within housing 22, such as trunnion shaft 62. In a preferred form, one of the spindle shaft end 58b and trunnion shaft 62 will define a protrusion and the other will define a mating recess for receiving at least a portion of the protrusion to connect the spindle shaft end 58b and the trunnion shaft 62. In the embodiment illustrated, second end 58b of spindle 58 defines a polygonal post and trunnion shaft 62 defines a sleeve, such as socket 62a, having a shape that corresponds and mates with the shape of spindle shaft end 58b so that the spindle shaft 58 may be connected to and actuate trunnion shaft 62.

The trunnion shaft 62 has a gear 62b for actuating trunnion 64 of the cutting tool 20. In the form shown, the trunnion gear 62b engages the tilt trunnion 64 of cutting tool 20, which is responsible for tilting blade 26 between its forty-five and ninety degree (45°-90°) angle positions. For example, movement of the trunnion shaft 62 in one direction will move the blade toward a forty-five degree (45°) angle position with respect to the surface of table 24 so that forty-five degree (45°) cuts may be made to the workpiece. Movement of the trunnion shaft 62 in the opposite direction will move the blade toward a ninety degree (90°) angle position with respect to the surface of table 24 so that right angle or normal cuts may be made to the workpiece. The ability to adjust the angle of blade 26 allows the operator to use cutting tool 20 to perform a variety of cuts, at various angles, on the workpiece. In a preferred embodiment, the teeth of trunnion gear 62b engage mating teeth on tilt trunnion 64 so that rotation of trunnion gear 62b results in movement of the tilt trunnion 64. The number of teeth provided on trunnion 64 will determine the overall range of travel for blade 26 and will effectively define limits of travel for the same.

As mentioned above, the spindle 58 is movable between first and second positions. In the first position (FIGS. 3A and 3C), the spindle 58 is aligned so that the actuating gear 48 engages the drive shaft gear 42 of mobility system 34 and the second end 58b of spindle 58 is disengaged from the trunnion shaft 62. Thus, in this position, rotation of the spindle 58 will operate the mobility system 34 without adjusting the blade 26. In the embodiment illustrated, a clockwise rotation of the handle 60 will rotate the spindle 58 clockwise and cause the mobility system 34 to move wheel assemblies 34a to their extended position. Conversely, a counterclockwise rotation of handle 60 will rotate the spindle 58 counterclockwise and cause the mobility system 34 to move wheel assemblies 34a to their retracted position. The wheel 60 will be prevented from further rotation once the limits of travel of mobility system 34 have been reached.

In the second position (FIGS. 3B and 3D), the spindle 58 is aligned so that the actuating gear 48 is disengaged from the drive shaft gear 42 of mobility system 34 and the second end 58b of spindle 58 is connected to the socket 62a of trunnion shaft 62. Thus, in this position, rotation of the spindle 58 will operate the trunnion shaft 62 and trunnion gear 62b thereby adjusting the blade 26 without affecting the mobility system 34. In the embodiment illustrated, a clockwise rotation of the handle 60 will rotate the spindle 58 and trunnion shaft 62 clockwise, causing the blade 26 to be moved toward its forty-five degree (45°) angle position. Conversely, a rotation of the handle 60 will rotate the spindle 58 and trunnion shaft 62 counterclockwise, causing the blade 26 to be moved toward its perpendicular or ninety degree (90°) angle position. The handle 60 will be prevented from rotating once the limits of travel of blade 26 have been reached.

The spindle 58 is maintained in position and aligned with drive shaft gear 42 and trunnion shaft 62 via a support, such as bracket 66, which is mounted to housing 22. In the embodiment illustrated, the bracket 66 is mounted on the inner surfaces of front panel 22a and right side panel 22b. The cutting tool 20 will also preferably include a second support, such as bracket 68, for maintaining the drive shaft 40 in position and aligning the drive shaft gear 42 with actuation gear 48 of spindle 58. In the form illustrated, the bracket 68 is mounted on the inner surface of right side panel 22b below the spindle support bracket 66.

The cutting tool 20 may also include a biasing mechanism, such as spring 70, which is used to normally bias the spindle 58 in a desired position. In the embodiment illustrated, the spring 70 biases the spindle 58 in the blade adjustment position. Thus, the spindle 58 is normally positioned to make an adjustment, such as tilting or raising or lowering the blade 26, and can be moved into the mobility system actuation position by moving the spindle 58 to compress the spring 70 and move the actuating gear 48 into engagement with the drive shaft gear 42 so that the mobility system may be moved between its extended and retracted positions. The cutting tool 20 may also include a locking system or structure for securing the spindle in either the blade adjusting position or the mobility system actuation position, or both. For example, the cutting tool 20 may include a ball and detent mating system which locks the shaft 58 in the blade adjusting position once it has been placed in this position, or in the mobility system actuation position once it has been placed in this position.

Regardless of the actual configuration used, spindle 58 operates as a multifunctional spindle or shaft capable of controlling a plurality of functions of the cutting tool 20. More particularly, in the embodiment illustrated, spindle 58 is configured as a dual purpose spindle capable of operating the mobility system 34 when in a first position and adjusting the tilt angle of blade 26 when in a second position. It should be understood, however, that in alternate embodiments, separate shafts and/or handles may be provided and used for operating the blade mobility system and performing blade adjustments. For example, if it is desired to keep the actuator for mobility system 34 separate from other functions or actuators of the cutting tool 20, one shaft and handle may extend from housing 22 to control the mobility system and another, separate, shaft may extend from housing 22 to control the blade position. In yet other embodiments, the actuator for mobility system 34 may be tied to another function or actuator of cutting tool 20, rather than the tilt angle spindle 58. For example, in another form, the actuator for mobility system 34 may be integrated into the blade height spindle 112 in a manner similar to that discussed above with respect to tilt angle spindle 58 and handle 60.

It should also be understood that the gears used in the cutting tool 20 may be any of a plurality of different conventional gears. For example, the drive shaft gear 42 and actuating gear 48 are illustrated as mating bevel gears in FIGS. 3A-D. However, in an alternate embodiment, these gears may be worm gears as illustrated in FIG. 4. It should also be understood that any number of conventional structures may be used to mate the spindle 58 and trunnion shaft 62. For example, in alternate embodiments spindle end 58b may form a recess, rather than a protrusion, and trunnion shaft 62 may form a protrusion 68, rather than a recess, for engaging and mating with the recess of spindle end 58b.

In yet other embodiments, the cutting tool 20 may be designed with a dual purpose spindle 58 which does not require any of the gear members to disengage from their mating gear members. For example, in the embodiment of FIG. 4, the spindle and tilt trunnion shaft are illustrated as a single shaft having separately operable portions, such as a mobility system shaft portion and a trunnion shaft portion. For convenience, the mobility system shaft portion will be referred to as the spindle 58' and the trunnion shaft portion will be referred to as the trunnion shaft 62'. In this embodiment, the actuating gear 48' remains engaged with the drive shaft gear 42' and the trunnion gear 62b' remains engaged with the trunnion 64 regardless of the position of spindle 58'. More particularly, the spindle/trunnion shaft has an internal pin mechanism which selectively engages either the actuating gear 48' or the trunnion shaft 62' depending on what position the spindle/trunnion shaft is placed in. In the form illustrated, the internal pin mechanism engages and mates with recesses within the second end 58b' of the spindle 58' when the spindle is pulled out or moved away from the housing 22. While in this position, rotation of spindle/trunnion shaft will result in rotation of actuating gear 48' and drive shaft gear 42' thereby controlling the operation of mobility system 34 without affecting trunnion 64 or the trunnion shaft 62'. When the spindle/trunnion shaft is pushed in or moved toward the housing 22, the internal pin mechanism will move out of the mating recesses of spindle end 58b' and into a corresponding mating recess in socket 62a' of trunnion shaft 62'. Thus, while in this position, rotation of the spindle/trunnion shaft will result in rotation of trunnion shaft 62' thereby causing trunnion gear 62b' to move trunnion 64 without affecting the mobility system 34 or the spindle 58'.

To further ensure that the operation of one pair of gears (e.g., actuating gear 48' and drive shaft gear 42' or trunnion gear 62b' and trunnion 64) does not affect the other pair of gears, the cutting tool 20 may be designed with a larger space between the spindle end 58b' and the trunnion socket 62a' or designed with a ball bearing race or assembly separating the spindle end 58b' and the trunnion socket 62a' so that rotation of one pair of gears does not result in rotation of the other pair of gears. Alternatively, the gear pairs or shaft portions may be designed such that a specified amount of force must be applied in order to overcome the initial friction that will be encountered when trying to operate the pair of gears or shaft portions. Thus, the system would tolerate at least a minimal amount of friction between the spindle end 58b and trunnion shaft 62 without inadvertently affecting, or causing inadvertent operation of, one pair of gears when meaning to operate the other pair of gears.

The embodiment of FIG. 4 is preferable over the embodiment of FIGS. 3A-D because the gear members 42', 48', 62b' and 64 are never disengaged from one another and, therefore, do not need to be realigned with one another to properly engage when the operator wishes to switch the operating shaft between the mobility system actuation position and the blade adjustment position. More particularly, by keeping the gears 42', 48', 62b' and 64 in engagement in their respective pairs, there is less likelihood that the teeth of the gears will fail to align properly and jam or cause damage to one another, such as by stripping.

Regardless of the actual configuration that is used, cutting tool 20 will preferably have an internal retractable mobile base assembly 34 that is movable between an extended position wherein the cutting tool 20 rests on a portion of the mobility system 34 and a retracted position wherein the cutting tool 20 rests firmly on its own housing 22, rather than on the mobility system 34. Such a mobility system 34 will allow traditional stationary cutting tools, such as cabinet saws and stationary table saws, to be easily moved from one location to another which is particularly helpful when working with a smaller workshop where space is always an issue. Thus, cutting tool 20 may now be an option for smaller workshop owners who, until now, would have been forced to purchase smaller cutting tools or equip their existing tool with aftermarket mobile bases that do not allow the cutting tool to rest firmly on their own housing.

As illustrated in FIGS. 5A-D, the cutting tool 20 may also include an internal storage compartment, such as drawer 72, for storing items and equipment internally to the cutting tool 20 and/or to shelter and remove these items from the outer workshop environment. The drawer 72 is movable between an open position wherein the drawer 72 is extended from the cutting tool housing 22 so that the items or equipment may be placed in or removed from the drawer 72, and a closed position wherein the drawer 72 is inserted into the cutting tool housing 22 so that the items or equipment are stored within the cutting tool housing 22. The drawer may be used for storage of items and equipment meant for use in conjunction with the cutting tool 20, or other items which are not specifically meant for use with cutting tool 20.

The drawer 72 may be connected to the housing 22 in any of the known manners for connecting a drawer to its base, including any of a number of conventional rail slide systems or assemblies. In a preferred form, however, the drawer 72 is connected to the housing 22 using a conventional two or three rail slide system 74 so that the drawer 72 may be extended out from the housing 22 in an amount sufficient to provide access to the entire interior space defined by the drawer 72 so that an operator can easily insert and remove items or equipment from the drawer 72 and utilize all of the internal storage space provided by the drawer 72.

The drawer 72 may also include compartments that are designed for specific items or equipment and/or define supports for holding specific items or equipment. For example, in the embodiment illustrated, drawer 72 defines a cutting implement compartment 72a for storing cutting implements such as saw blades, a general compartment 72b for storing miscellaneous other items, and supports, such as bracket 72c, for mounting specific tools, such as miter gauge 76. The cutting implement compartment 72a may be used to store the saw blade 26 when the cutting tool 20 is not in use, and/or may be used to store replacement saw blades or other types of saw blades, such as dato blades or dato sets. The general compartment 72b may be used for storing miscellaneous items, such as owner's manuals, magazines, wrenches and other hand tools, table inserts, feather boards, push sticks or the like. The supports 72c defined by drawer 72 may be integral to the drawer itself, as illustrated in FIGS. 5A-D, or may be separate components which are attached to the drawer 72 in order to define the specific type of support or bracket desired. In the illustrated embodiment, the rear wall of drawer 72 and a sidewall of the cutting implement compartment 72a define a support for mounting miter gauge 76 when it is not being used on table 24.

In the embodiment illustrated, the drawer 72 is designed to avoid interfering with the internal components of the cutting tool 20. More particularly, the side walls of general compartment 72b are smaller in size than the side walls of cutting implement compartment 72a so that they do not interfere with the movable internal components of the cutting tool 20, such as dust collector assembly 108 and motor and trunnion assembly 80 when these components are being moved between their forty-five degree (45°) and ninety degree (90°) blade positions. The dimensions of the drawer 72 are also designed so that the drawer 72 does not interfere with the operation of mobility system 34 or blade height spindle 110 or handle 112.

In a preferred form, the drawer 72 also includes a gripping area, such as handle 72d, and provides space for placing indicia on a surface thereof. In the embodiment illustrated, handle 72d is in the form of an elongated body having a generally inverted U-shaped cross-section and is mounted to the upper front portion of the drawer so that the operator does not need to bend too low in order to open or close the drawer 72. The handle 72d provides a large, elongated, gripping area which the operator may grasp from anywhere along the front of the drawer 72 in order to open or close the drawer 72.

Thus, the drawer 72 may be used to assist the operator in storing items and equipment so that these items or equipment are not lost or misplaced and/or are readily available to the operator. The internal storage provided by drawer 72 is also helpful in smaller workshops in that it gives the operator additional space to store items and equipment that would not otherwise be there. Furthermore, unlike external storage options available on conventional cutting tools, the internal storage provided by drawer 72 allows the operator to shelter or remove certain items or equipment from the external workshop environment which can be particularly helpful in keeping the items or equipment generally free of sawdust and other airborne particles and operating properly.

The cutting tool 20 may also include an access panel, such as cover 78. As illustrated in FIGS. 5A-D, the cover 78 will be preferably located on a side other than the front side 22a of cutting tool housing 22, and will provide an operator access to at least one of the internal components of cutting tool 20, such as the motor 80a of motor and trunnion assembly 80. In a preferred form, the cover 78 is made out of a polymeric material, such as a rubber, plastic, or composite, and has an integral handle 78a located on a side thereof. The cover 78 is connected to the housing 22 via at least one hinge which is preferably located on the side opposite integral handle 78a. Thus, the operator may pull on handle 78a and pivot one side of cover 78 away from housing 22 into its open position in order to gain access to the motor 80a located therein. In the form illustrated, the cover 78 forms a large internal cavity within which at least a portion of the motor 80a of motor and trunnion assembly 80 may move when the motor and trunnion assembly 80 is moved between its forty-five degree (45°) and ninety degree (90°) blade positions.

In alternate embodiments, the housing 22 of cutting tool 20 may simply be made larger to contain the entire motor and trunnion assembly 80 and provide space for the movement of the motor 80a. In such an embodiment, the cutting tool 20 may still include an access panel, however, the access panel will likely be made directly in a side of the housing 22 and made of a material similar to the rest of the housing 22, such as metal. In other embodiments, the cutting tool 20 may be provided without any access panel, if desired. It should be understood, however, that in a preferred form of cutting tool 20, the table 24 will be removable from the housing 22 in order to provide access to the interior of the housing 22 and/or the equipment located therein.

In addition to the motor and trunnion assembly 80, the interior of the cutting tool 20 also includes an arbor assembly as illustrated in FIG. 6 and FIGS. 7A-E. The arbor assembly generally includes an arbor 82 which forms an elongated shaft on which the blade 26 may be rotated. The first end of the elongated arbor shaft defines a threaded bolt portion 82a upon which nut 84 may be threaded. As illustrated most clearly in FIG. 6, the threaded portion 82a of the elongated arbor shaft is inserted through the central openings of a first bearing member 86, spacer 88 and second bearing member 90. This assembly is then inserted into opening 92a defined by arbor housing 92. A second spacer 94 and an arbor driving member, such as pulley 96, are connected to the threaded portion 82a of arbor 82 from the other side of the arbor housing opening 92a and the entire assembly is drawn together by tightening nut 84 onto the threaded portion 82a. In addition to drawing the assembly together, nut 84 also preloads the bearing members 86 and 90 and keeps the bearings safely encased within arbor housing 92 so that they provide sufficient support and assistance to arbor 82 and are protected from outside interferences, such as airborne particles which may otherwise interfere with their operation.

The second end of the elongated arbor shaft defines a blade securing member, such as flange 82b, and a second threaded bolt portion 82c. The arbor 82 also includes a spacer, such as shoulder member 82d, which spaces the flange 82b apart from the arbor housing 92 so that no friction is created between these components and arbor 82 remains freely rotatable with respect to arbor housing 92. When installing a blade 26 on the arbor 82, the threaded end 82c is inserted into the central opening of the blade and a second blade securing member, such as a hub or disc (not shown) similar in shape to flange 82b, is connected to the threaded end 82c via a second nut. Once the second nut has been fastened to the threaded bolt 82c of the elongated arbor shaft, the blade 26 will be securely fastened or sandwiched between the first and second blade securing members so that the arbor 82 may rotate the blade 26 when driven by motor 80a. Conversely, when the operator wishes to remove the saw blade, the second nut and second blade securing member will be removed from threaded portion 82c of elongated arbor shaft 82 so that the blade 26 may be removed from the shaft end 82c.

The motor 80a is connected to the arbor shaft 82 and drives the arbor and saw blade 26 connected thereto via a driving member, such as a belt. More particularly, in the form illustrated, a V-belt is used to connect the output shaft of motor 80a to pulley 96 of arbor 82 so that the motor may drive the arbor shaft 82 to rotate the blade 26. The arbor 82 and arbor housing 92 are also connected to the motor and trunnion assembly 80 so that the arbor 82 and blade 26 move with the motor and trunnion assembly when its position is adjusted (e.g., when it is raised or lowered via handle 112 or tilted via handle 60).

In order to assist the operator in attaching, removing or replacing blade 26, the cutting tool 20 may include a brake member, such as arbor lock 98 of FIGS. 7A-E. In a preferred form, at least one of the arbor lock 98 and arbor 82 will have a protrusion extending therefrom and the other will have a mating recess for receiving at least a portion of the protrusion to prevent the arbor 82 from rotating while the operator attaches, removes or replaces blade 26. For example, in the embodiment illustrated, the arbor lock 98 has a body, such as sliding actuator 100, which defines a protrusion 100a for inserting in or mating with the recess 82e defined by the flange 82b of arbor 82. The actuator 100 may be movable between a first position wherein the protrusion 100a of actuator 100 is slid into the recess 82e defined by arbor flange 82b to prevent the arbor 82 from rotating and a second position wherein the protrusion 100a of actuator 100 is slid out of the recess 82e to allow the arbor 82 to freely rotate. Thus, the arbor lock 98, which is connected to the arbor housing 92, is movable between a locked position wherein the arbor lock 98 prevents the arbor 82 from rotating, and an unlocked position wherein the arbor 82 is freely rotatable.

In the embodiment illustrated, arbor lock 98 is connected to arbor or bearing housing 92 and may be linearly slid between its locked and unlocked positions. Moreover, in a preferred form, a plurality of mating recesses 82e will be provided into which the protrusion 100a may be inserted in order to lock the arbor 82. For example, in the embodiment illustrated, the arbor flange 82b defines four recesses 82e, with each recess located opposite another recess, so that the operator will have a plurality of locations on flange 82b to move the arbor lock 98 into its locked position. This allows the arbor 82 to be locked into position without requiring the operator to rotate the blade 26 and arbor 82 into one specific position thereby making it quicker and easier to lock the arbor 82 via arbor lock 98.

Although the embodiment illustrated shows the actuator 100 defining the protrusion 100a and the arbor flange 82b defining recess 82e, it should be understood that in alternate embodiments, the actuator 100 may define a mating recess, such as recess 82e, and the arbor flange 82b may define a protrusion, such as protrusion 100a, if desired. In other embodiments, the actuator 100 and flange 82b may each define any combination of protrusions and recesses which mate with one another in order to lock the arbor 82 so that the blade 26 may be installed, removed or replaced in a manner similar to that discussed above. In yet other embodiments, the actuator 100 may be located on the arbor 82 rather than on the arbor housing 92, and may have structures for mating with the arbor housing similar to those discussed above in order to prevent the arbor 82 from rotating so that the blade 26 may be more easily installed, removed or replaced.

In the embodiment illustrated in FIGS. 6 and 7A-E, however, the actuator 100 is connected to arbor housing 92 and has a generally L-shaped body with a first leg portion 100b serving as a grip or handle for operating the actuator 100 and the other leg portion 100c serving as an anchor for securing the actuator 100 to the arbor housing 92. The grip portion 100b will preferably have a bend near its distal end in order to provide a more comfortable and easily operable handle for the operator to grasp and use. In the embodiment illustrated in FIG. 7A, the handle portion 100b bends toward the arbor flange 82b. However, in a preferred embodiment, the bend in handle portion 100b will actually be away from arbor flange 82b in order to provide the operator with ample room between the handle portion 100b and the arbor flange 82b and blade 26 so that the actuator 100 may be easily slid between its locked and unlocked positions.

The protrusion 100a may extend from either leg portion 100b-c, however, in the form illustrated, the protrusion 100a extends from a portion of the anchor leg 100c which extends out in front of the handle portion 100b. Thus, with this configuration, the actuator 100 appears slightly more like an inverted T-shaped body rather than a true L-shaped body. The extension 100d from which the protrusion 100a extends will preferably extend perpendicularly out from the actuator 100 and arbor housing 92, normal to the arbor flange 82b so that the protrusion 100a may be inserted into any one of the mating recesses 82e. It should be understood, however, that in alternate embodiments, the extension 100d may extend from the grip portion 100b of actuator 100, rather than anchor portion 100c. In yet other embodiments, no extension portion 100d may be provided and the leg portions 100b and/or 100c will simply serve as the projection which engages a mating recess in flange 82b.

In a preferred form, the arbor housing 92 defines a passageway, such as channel 92b, within which at least a portion of the actuator 100 is positioned. In the embodiment illustrated, the actuator 100 is designed to linearly move between the locked position and the unlocked position and the channel 92b of housing 92 helps guide actuator 100 between its linear limits of travel and helps prevent axial rotation or movement of the actuator 100 when locking the arbor 82.

Figure 7A:
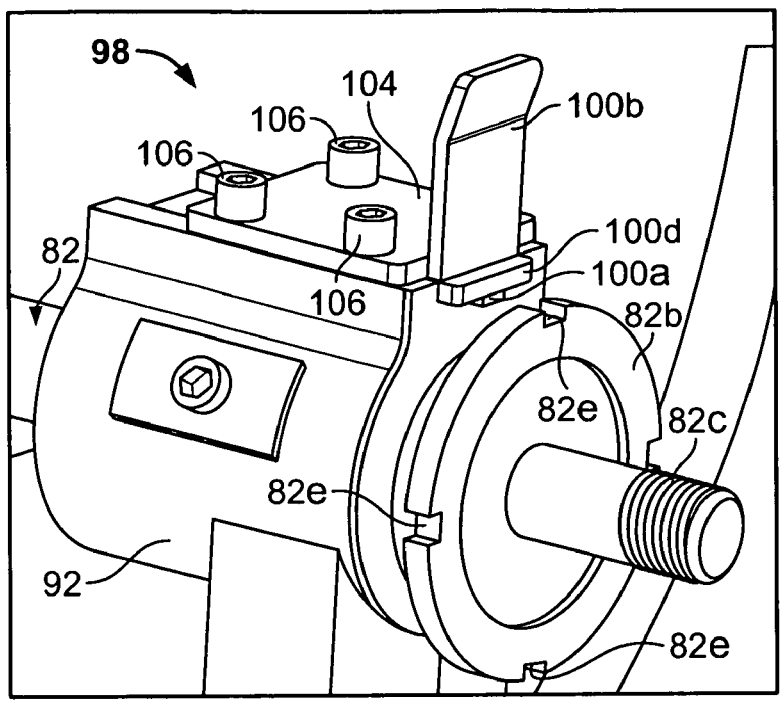
FIG. 7A is a perspective view of the arbor lock of the cutting tool of FIGS. 1A-F, showing the arbor lock in the unlocked position.
Figure 7B:
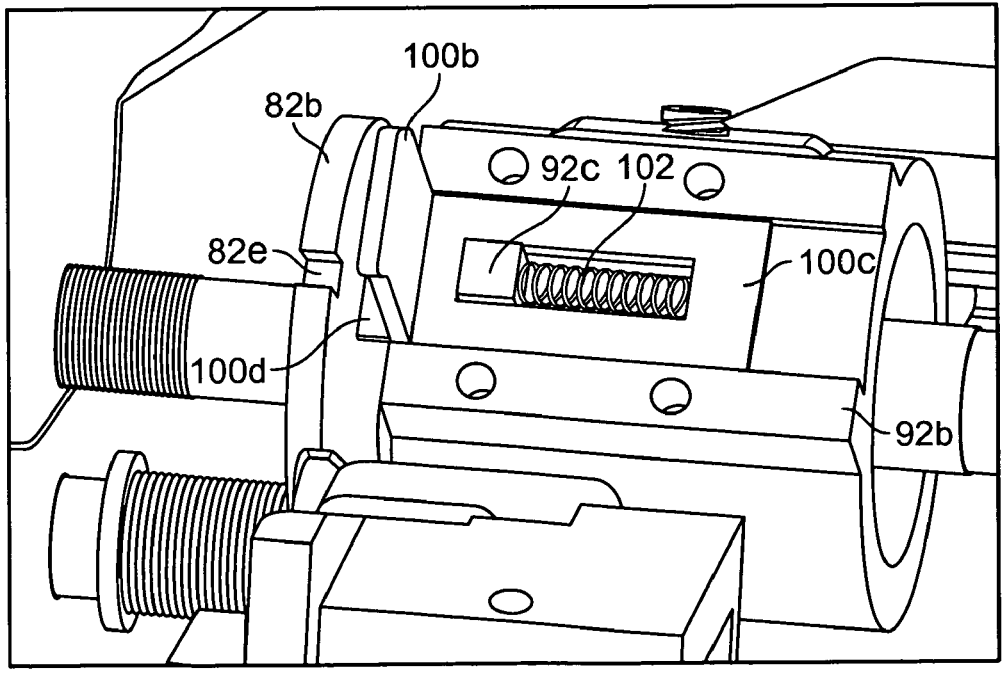
FIG. 7B is a perspective view of the arbor lock of FIG. 7A, showing the cover and cover fasteners removed to expose the internal structure of the arbor lock.
Figure 7C:
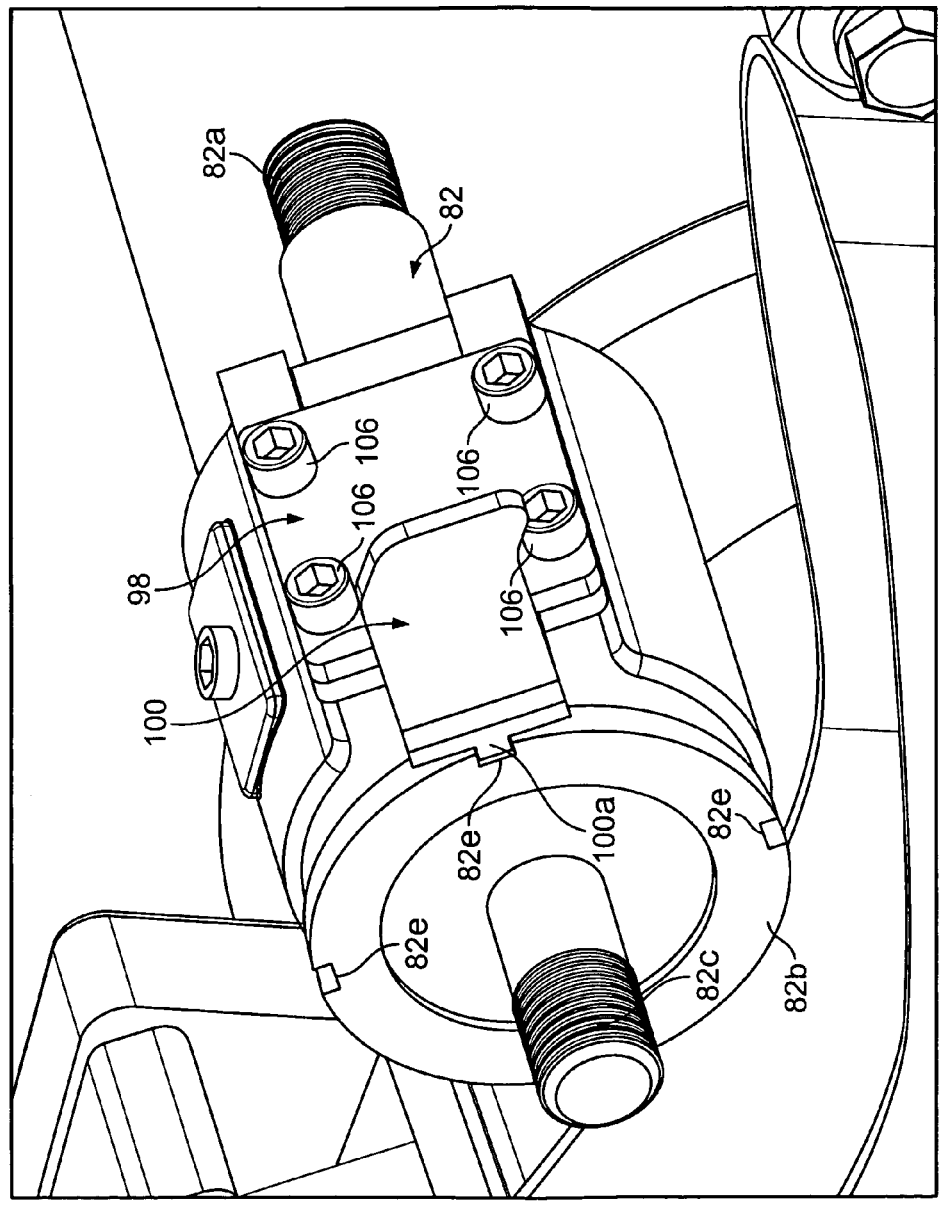
FIG. 7C is a perspective view of the arbor lock of FIG. 7A, showing the arbor lock in the locked position.
Figure 7D:
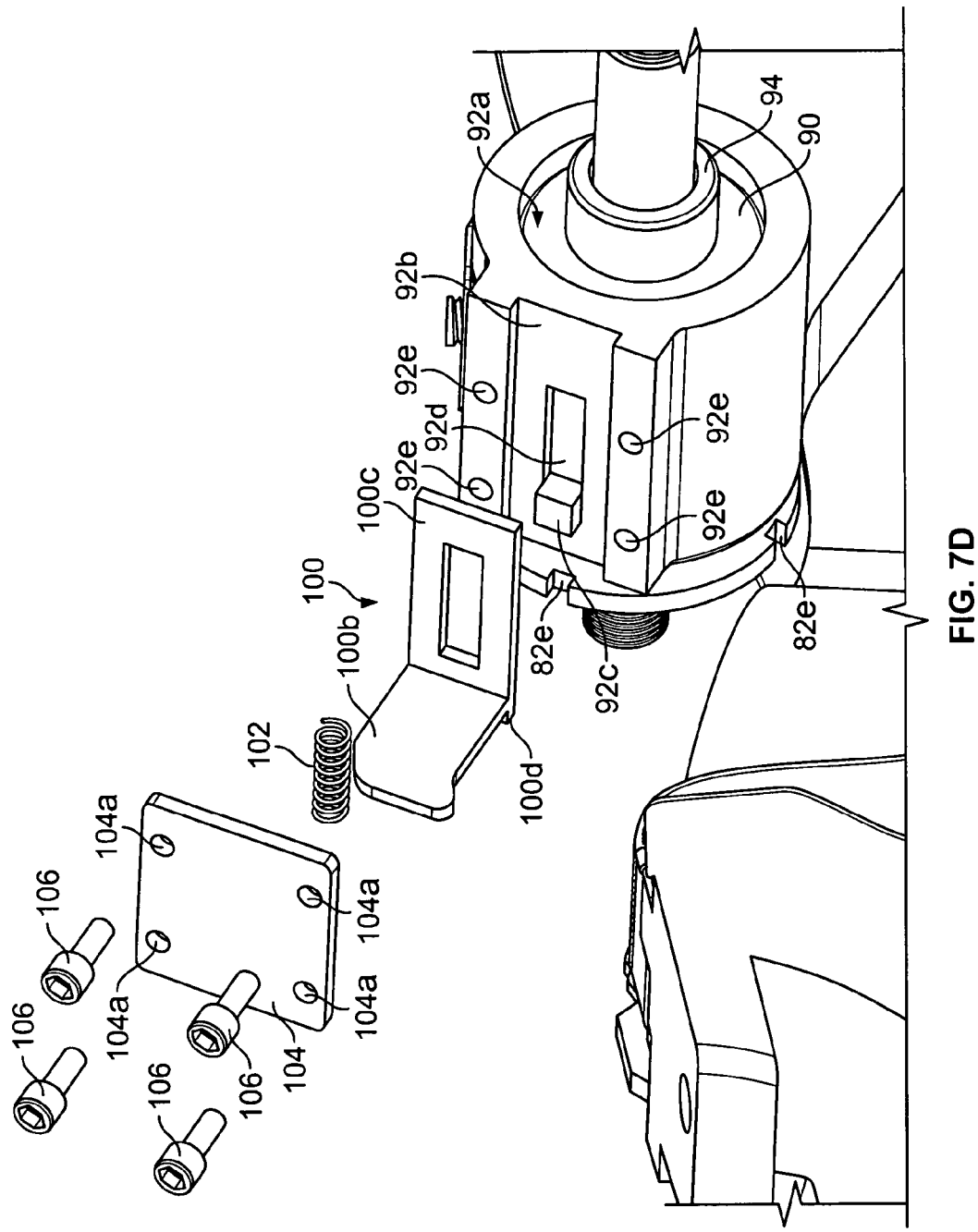
FIG. 7D is an exploded view of the arbor lock of FIG. 7A.
Figure 7E:
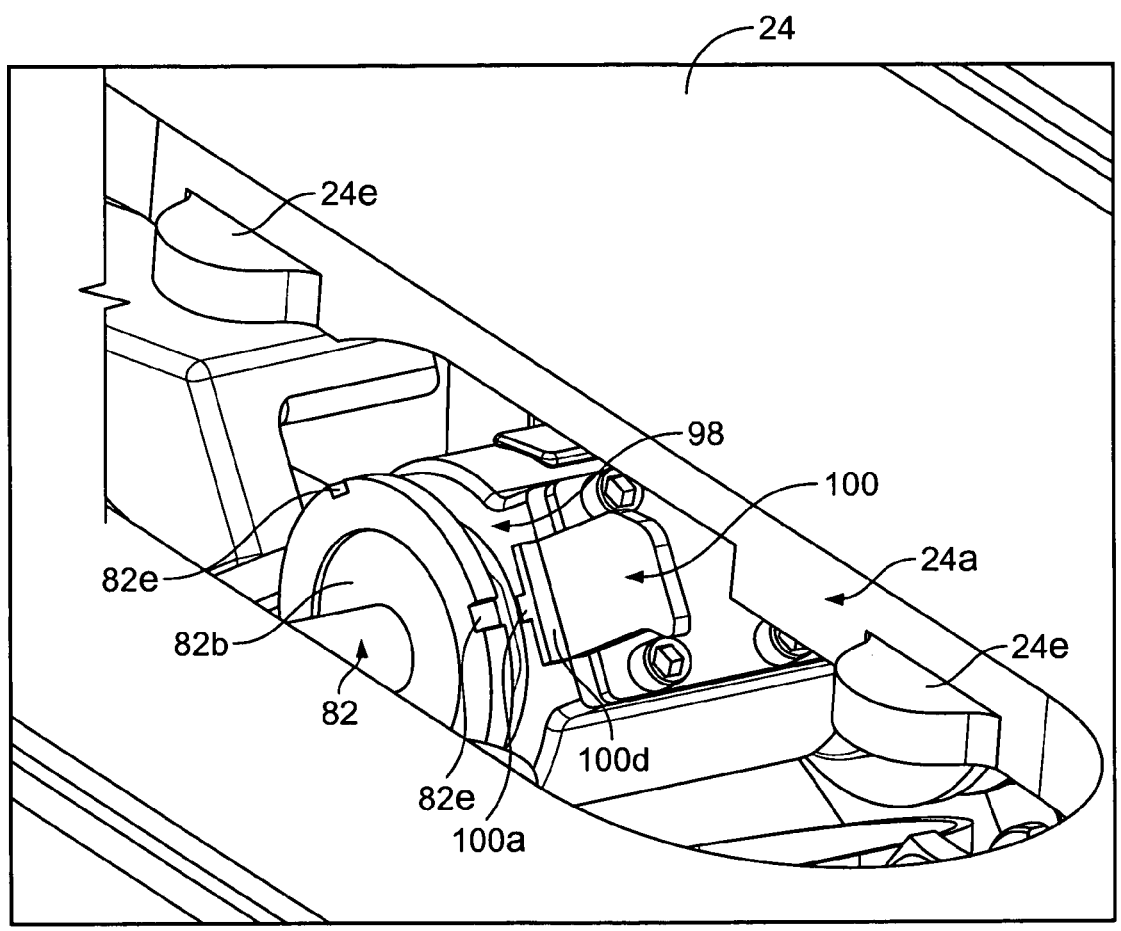
FIG. 7E is a perspective view of the arbor lock of FIG. 7A, as viewed through the opening of the cutting tool table.

The housing 92 also defines a body, such as stop 92c, and a second passageway, such as groove 92d, which cooperate with a biasing mechanism, such as spring 102, to bias the actuator 100 toward the unlocked position. More particularly, the anchor leg 100c of actuator 100 defines an opening into which the stop 92c is inserted. As illustrated in FIGS. 7B and 7D, the anchor leg opening and groove 92d, define a recess into which the spring 102 may be inserted. Thus, when the actuator 100 is moved toward the locked position, the actuator 100 slides toward the arbor flange 92b causing the anchor leg 100c of actuator 100 to compress spring 102 between an end of the anchor leg opening and the stop 92c. When the actuator is released, the spring 102 drives the actuator 100 back to the unlocked position by exerting force on the end of the anchor leg opening. Thus, the biasing mechanism 102 biases the actuator 100 into the unlocked position, where the actuator will remain until the operator manually moves the actuator 100 into its locked position.

The spring 102 and actuator 100 are connected to the arbor housing 92 via a cover member 104, which is preferably releasably fastened to the arbor housing 92 via fasteners, such as screws or bolts 106. More particularly, the bolts 106 are inserted through bores 104a located in the corners of cover 104 and are fastened into corresponding threaded bores 92e defined by arbor housing 92. Once assembled, the actuator may be slid between its locked position, wherein the protrusion 100a is inserted into mating recess 82e of arbor 82, and its unlocked position, wherein the protrusion 100a is removed from the mating recess 82e so that arbor 82 may be freely rotated.

Thus, arbor lock 98 forms a spring loaded slide which can be moved between a locked position, wherein the arbor lock 98 engages the arbor 82 to prevent the arbor 82 from rotating so that the blade 26 may be installed, removed or replaced, and an unlocked position, wherein the arbor lock 98 is disengaged from the arbor 82 and the arbor 82 may be freely moved to rotate the blade 26 when driven by motor 80a. In a preferred embodiment, biasing mechanism 102 biases the arbor lock 98 in the unlocked position to help ensure that the arbor lock 98 will not be inadvertently actuated during operation of the cutting tool 20. With this configuration, the arbor lock 98 and arbor housing 92 form an integral component which the operator may use by reaching into opening 24a of table 24 to manually move arbor lock 98 between its locked and unlocked position.

Figure 8A:
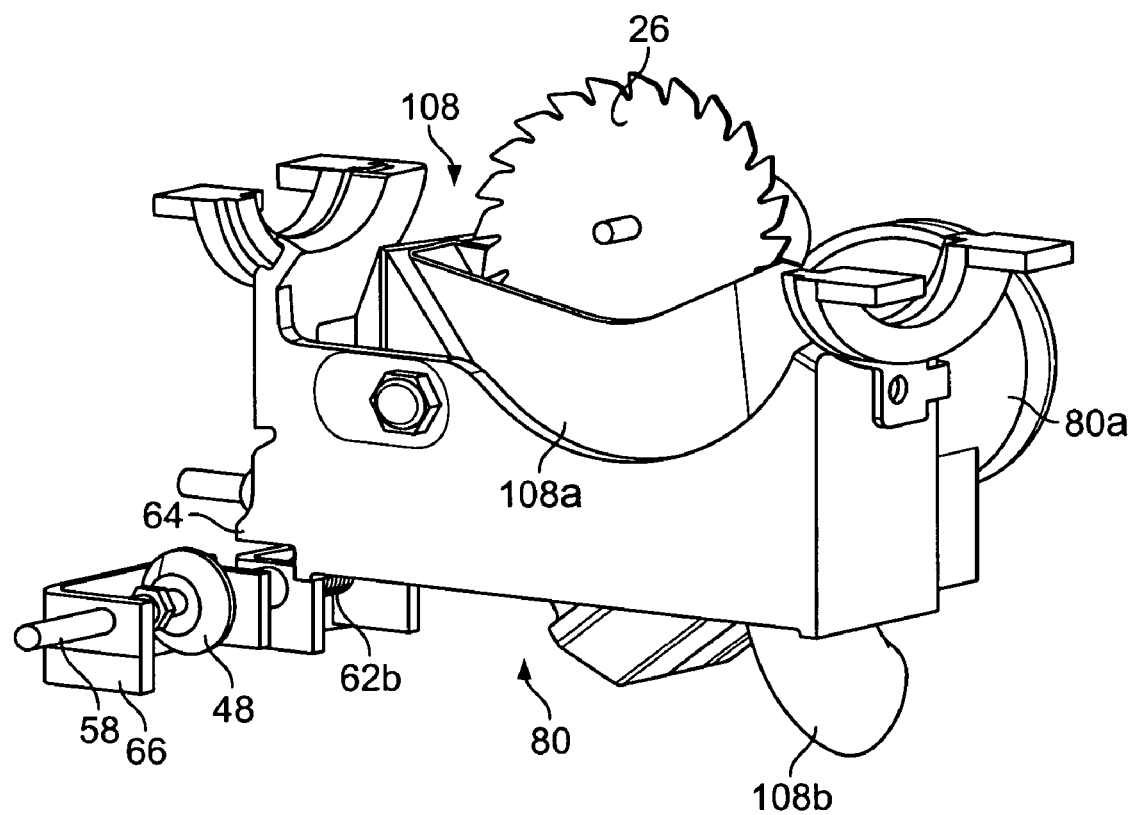
FIGS. 8A-B are perspective and top views of the dust collection system of the cutting tool of FIGS. 1A-F.
Figure 8B:
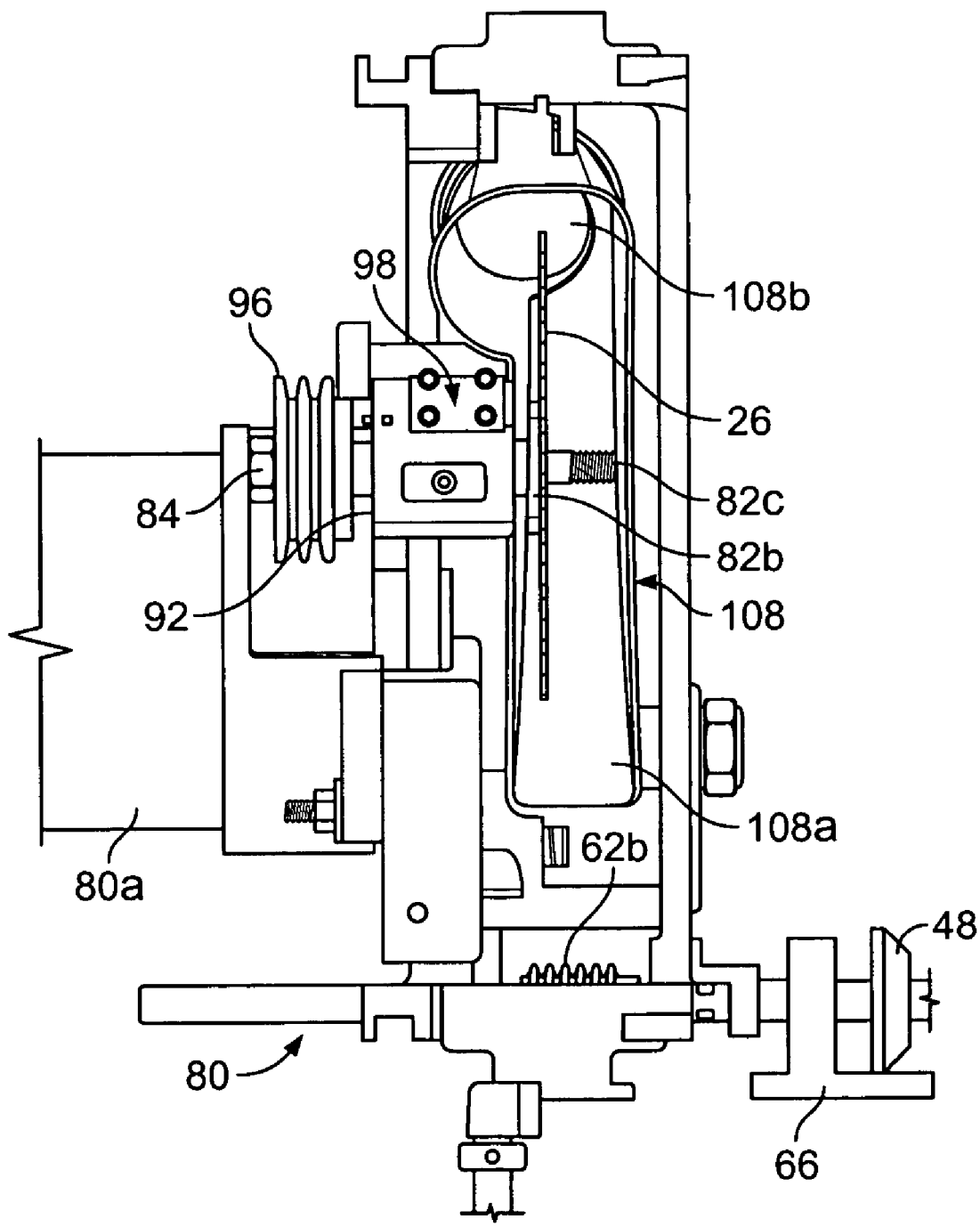
Figure 9A:
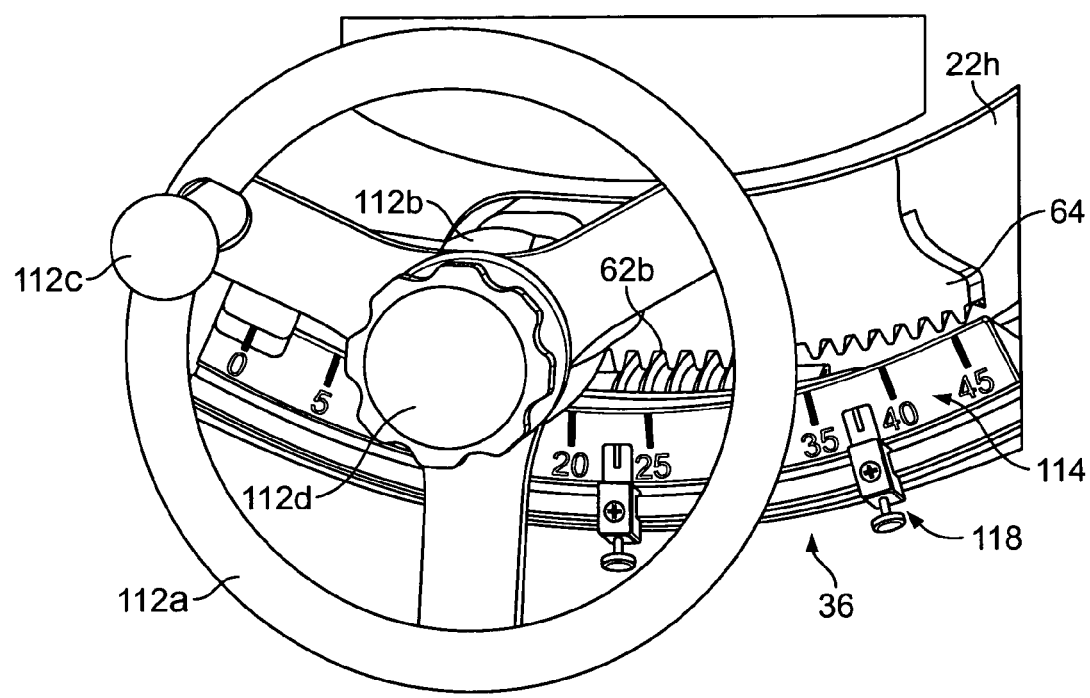
FIGS. 9A-B are enlarged perspective views of the angle memory indicator of the cutting tool of FIGS. 1A-F.
Figure 9B:
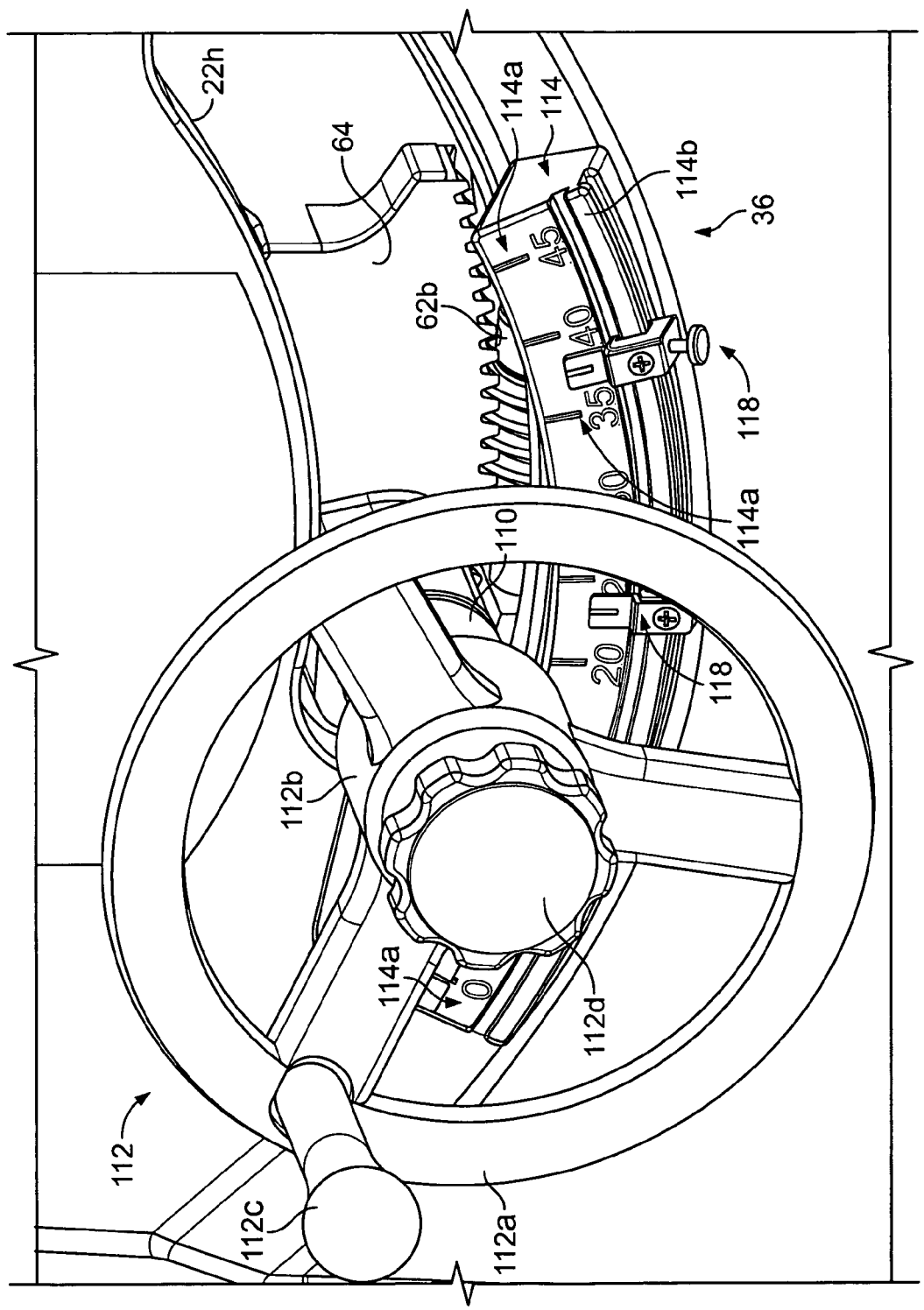
Figure 9C:
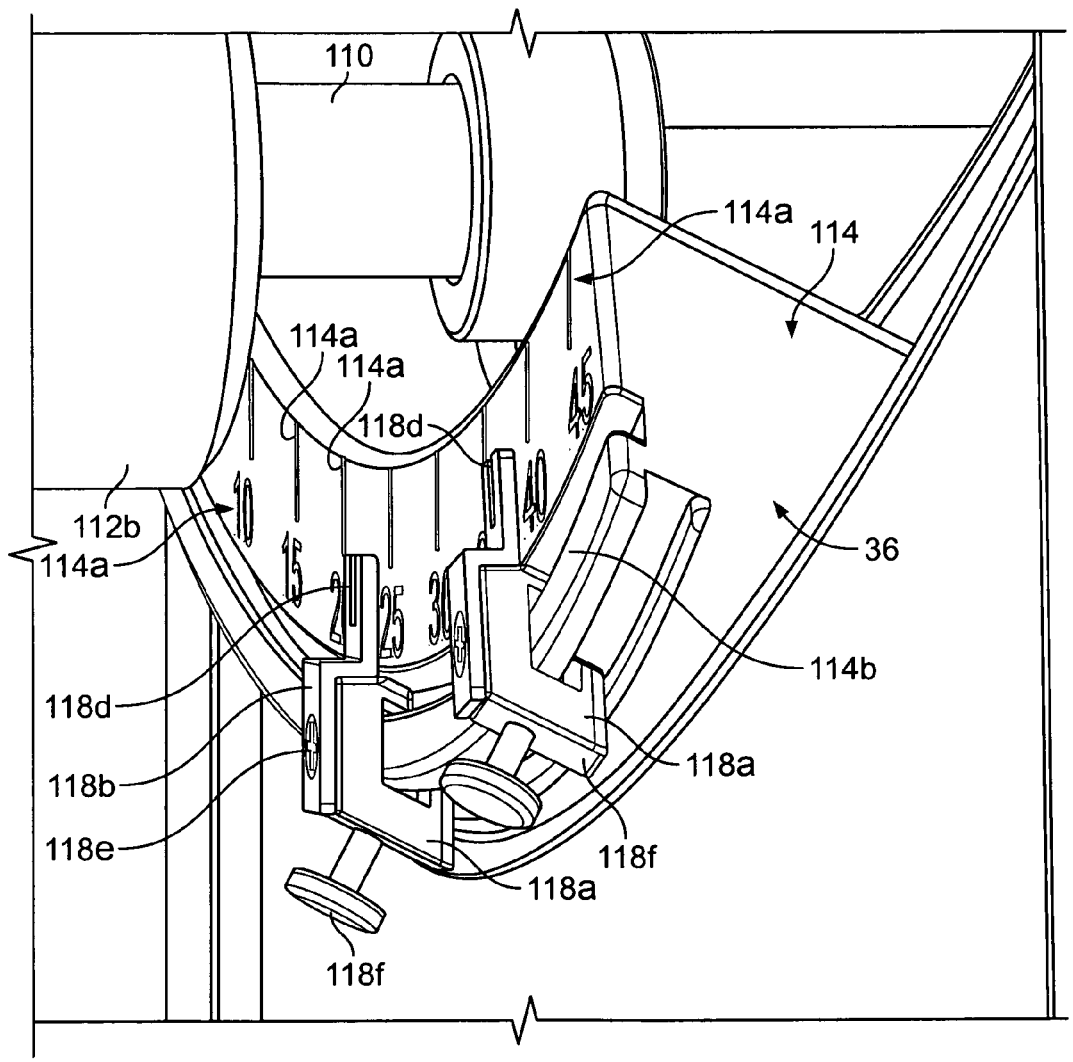
FIGS. 9C-D are additional perspective and front elevational views, respectively, of the angle memory indicator of FIGS. 9A-B.
Figure 9D:
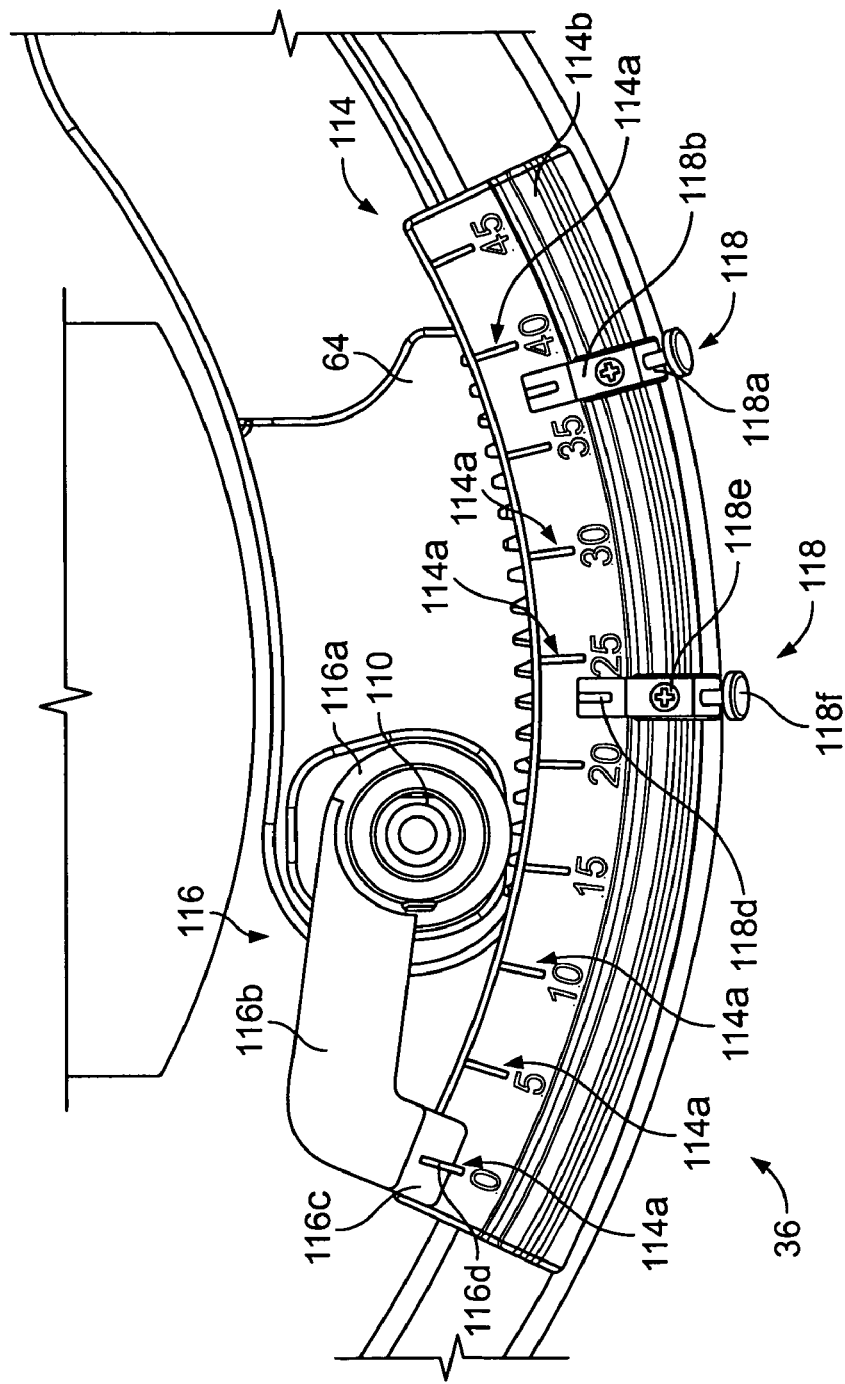
Figure 10:
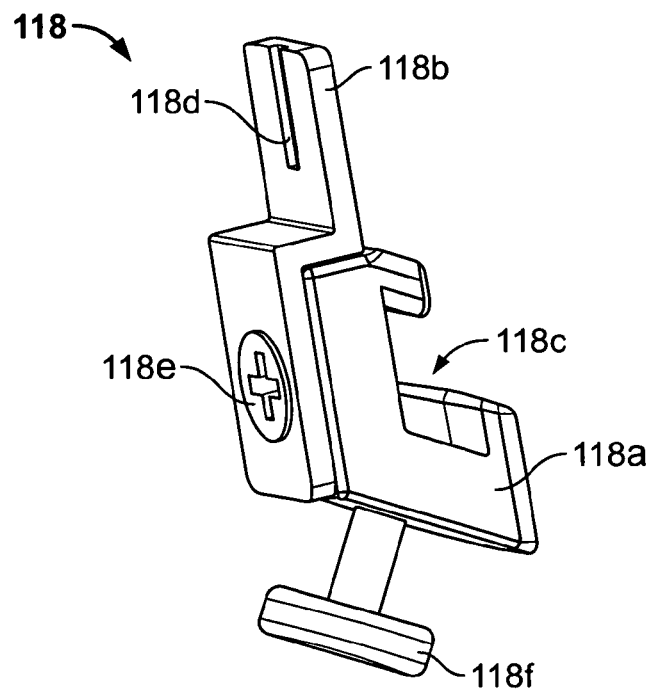
FIG. 10 is a perspective view of a portion of the angle memory indicator of FIGS. 9A-B.
Figure 11A:
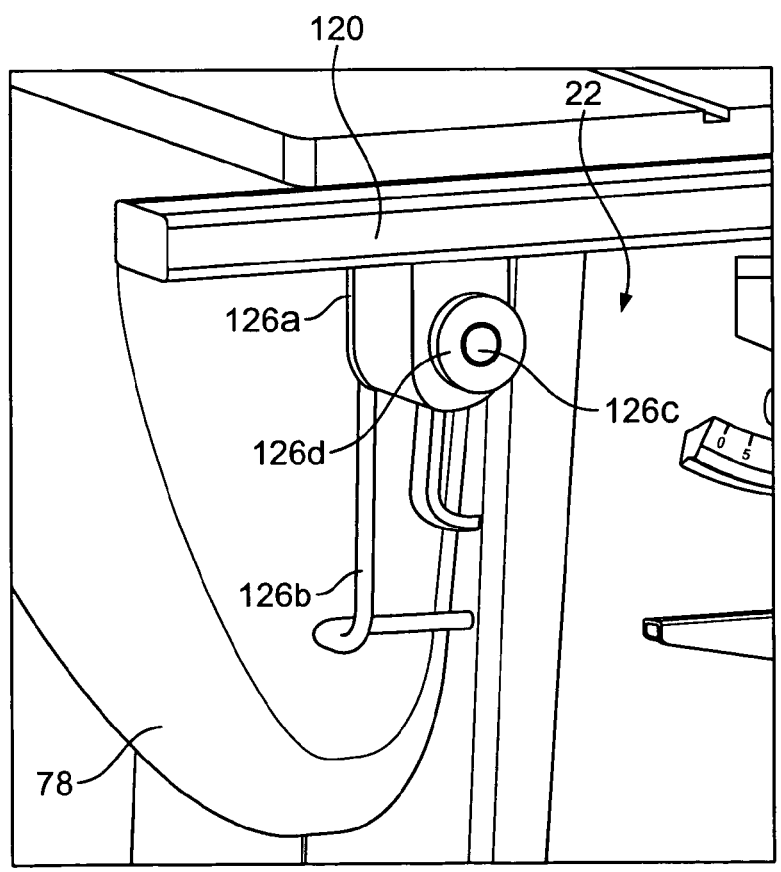
FIGS. 11A-B are enlarged perspective views of the actuator of the cutting tool of FIGS. 1A-F.
Figure 11B:
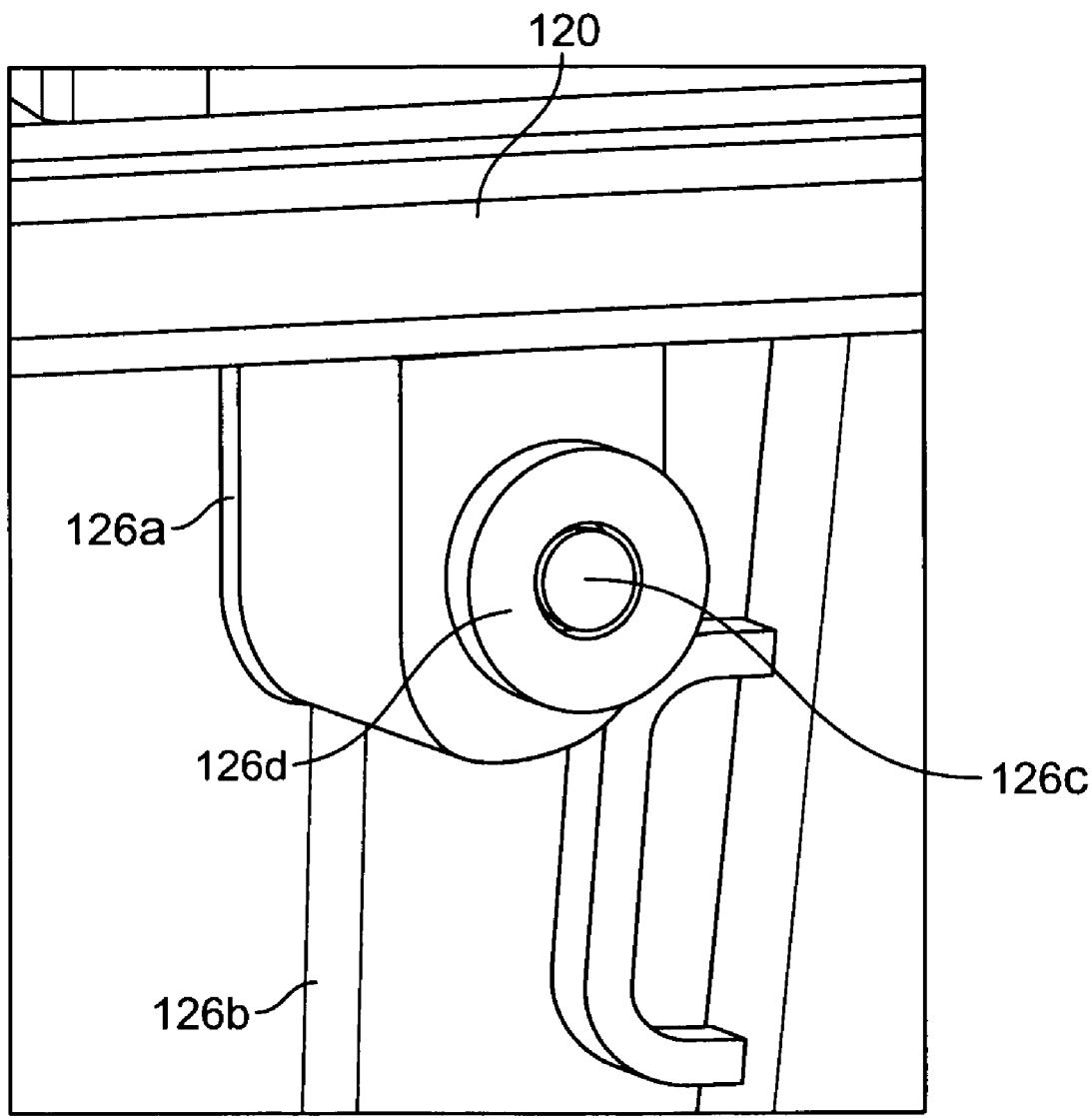

In addition to the motor and trunnion assembly 80, and arbor assembly 82, the interior of the cutting tool 20 also includes a dust collection assembly 108 as illustrated in FIGS. 8A-B. The dust collection assembly 108 includes a sleeve, such as shroud 108a within which at least a portion of the saw blade 26 is disposed, and a passageway, such as exhaust port 108b, to which a dust collector conduit may be attached. In the embodiment illustrated, the shroud 108a is positioned around the sides and bottom of blade 26 to collect dust and other scrap which is removed from the workpiece. When assembled, a conduit, such as a hose, connects the exhaust port 108b of dust collection assembly 108 to the secondary exhaust port 22g defined by rear panel 22c of cutting tool housing 22. Thus, a dust collector may be connected to the secondary exhaust port 22g of cutting tool 20 to remove the dust and other scrap as the blade 26 cuts through the workpiece. More particularly, the dust and scrap will be vacuumed or sucked through the shroud 108a and exhaust port 108b, through the conduit and out of the cutting tool 20 via secondary exhaust port 22g. In a preferred form, the dust collection assembly 108 is also connected to the motor and trunnion assembly 80 so that it moves along with the blade 26 when it is tilted via spindle 60 or raised and lowered via spindle 110 and handle 112.

It should be understood, however, that alternate embodiments of cutting tool 20 may be provided with the dust collection assembly 108 mounted in a different position or with a different configuration. For example, in another embodiment, the secondary exhaust port 22g may be provided in another location of the cutting tool, such as on one of the side panels 22b or 22d or in base 22e. In another embodiment, one of the side panels 22a-d or base 22e may simply define an opening through which a dust collection conduit may pass and be connected directly to the primary exhaust port 108b of dust collection system 108. In yet other embodiments, the cutting tool 20 may be provided without a dust collection assembly 108 if so desired.

The cutting tool 20 may also include another blade adjustment mechanism, such as height adjustment spindle 110 illustrated in FIGS. 9A-D. The blade height adjustment shaft 110 extends out through opening 22h defined by the front panel of cutting tool housing 22. The end of height adjustment spindle 110 is connected to an actuator, such as handle 112. Like tilt spindle handle 60, handle 112 is a hand wheel having a ring shaped gripping portion 112a that extends out from and is connected to a center hub 112b, and has a post shaped gripping portion 112c extending out from the ring 112a to provide the operator with options for gripping and actuating blade height adjustment wheel 112. The post 112c is connected to the ring 112a via a fastener, such as a screw, and the ring 112a and hub 112b are connected to the spindle 112 via a fastener, such as nut or knob 112d.

In the embodiment illustrated, a clockwise rotation of the handle 112 will rotate the spindle 110 clockwise and cause the blade 26 to lower with respect to the upper surface of table 24. Conversely, a counterclockwise rotation of handle 112 will rotate the spindle 110 counterclockwise and cause the blade 26 to rise with respect to the upper surface of table 24. The spindle 110 is maintained in position and aligned via the tilt trunnion 64. As such, the spindle 110 and opening 22h are configured to allow for the movement of spindle 110 when the motor and trunnion assembly 80 is adjusted via spindle 58 and handle 60. For example, opening 22h is arcuately shaped or curved so that the spindle 110 may move along with the tilt trunnion 64 as the blade 26 is moved between its forty-five degree (45°) and ninety degree (90°) blade angle positions. In the embodiment illustrated, the spindle 110 extends out from the left side of opening 22h when the tilt trunnion 64 is positioned at the ninety degree (90°) blade angle position and will move to the right, eventually extending out of the right side of opening 22h, when the tilt trunnion 64 is positioned at the forty-five degree (45°) blade angle position.

The cutting tool 20 may also include a blade angle indicator which the operator may use to determine the current angle of blade 26. In the embodiment illustrated in FIGS. 9A-D, the blade angle indicator includes a blade angle scale 114, which provides a series of marks or points at known intervals that an operator may use to measure the angle at which the blade 26 has been placed via tilt spindle handle 60. More particularly, in the form illustrated, the graduated blade angle scale 114 provides markings, such as numbers and lines 114a, beginning at zero and going up to the number forty-five at intervals of five. The blade angle indicator also includes a pointer 116, which is connected to the blade height adjustment spindle 110 and points to the marking on the graduated blade angle scale 114 that corresponds to the current angle of saw blade 26. The zero mark indicates that the blade 26 is positioned perpendicular to the table 24 or at the ninety degree (90°) blade angle position, and the forty-five mark indicates that the blade 26 has been tilted forty-five degrees (45°) with respect to table 24 or is at the forty-five degree (45°) blade angle position. Thus, the operator may use the scale 114 and indicator 116 to determine what angle the blade 26 has been positioned at between forty-five degrees (45°) and ninety degrees (90°) in five degree (5°) increments.

In the form illustrated, pointer 116 includes a bracket 116a for connecting the pointer 116 to spindle 110. The bracket 116a forms a cylinder through which the spindle 110 is inserted and is secured to the spindle 110 via a fastener, such as a set screw. An arm 116b extends out from the bracket 116a and terminates in an indicator member 116c for indicating the current angle of blade 26 on scale 114. Thus, when the blade 26 is tilted via spindle wheel 60, the pointer 116 and spindle 110 move along the scale 114 through opening 22h of cutting tool housing 20.

In the embodiment illustrated, indicator member 116c is made of a translucent material, such as plastic, and includes a marking, such as line 116d, which may be used by the operator to determine the marking on scale 114 corresponding to the angle of blade 26. For example, if blade 26 is to be adjusted to an angle divisible by five and between zero and forty-five, the operator can rotate tilt wheel 60 until the line 116d on pointer 116 aligns with the line 114a corresponding to the desired angle on scale 114. To further help the operator in adjusting the blade 26 to the desired angle and/or reading the current angle of blade 26, at least a portion of the translucent indicator member 116c overlaps with the markings on scale 114 so that the operator can more easily tell when the line 116d on the indicator member 116c and the line 114a on scale 114 are in alignment. In a preferred form, line 116d will overlap line 114a when the lines 114a and 116d are in alignment, thereby, making the pointer 116 and scale 114 appear to show one single line rather than two separate lines. This occurrence will indicate to the operator that the lines 114a and 116d are in alignment.

Although the graduated scale 114 provides markings between zero and forty-five, to represent blade angles between ninety degrees (90°) and forty-five degrees (45°), respectively, it should be understood that a variety of different markings may be used if desired. For example, in an alternate embodiment, a decrementing scale from ninety to forty-five may be used. In other embodiments, where blade 26 may be moved over a range of angles greater than or less than forty-five degrees (45°), the scale may be larger or smaller, as needed. In yet other embodiments, scale 114 may be broken into increments other than increments of five, if desired. For example, the scale 114 may use increments of one degree or increments of ten degrees.

The cutting tool 20 may also include a blade position memory indicator 36 for helping the operator keep track of a desired blade position, such as a desired blade angle. This is particularly helpful when the operator needs to return the blade 26 to a specific position multiple times during the course of a project or has to perform certain cuts on a routine basis. In the embodiment illustrated, the blade position memory indicator 36 includes a marker 118 selectively positionable about the scale 114 which may be used to keep track of a desired angle of blade 26. More particularly, the marker 118 may be moved to a position on scale 114, aligned with pointer 116, and secured in that position so that the operator may adjust the blade to whatever other angle he or she desires and still be able to quickly return to the previous angle by simply adjusting the blade until the pointer 116 is back in alignment with the marker 118.

The marker 118 includes a body 118a for traveling along scale 114 and a pointer 118b for keeping track of a desired blade position. In a preferred form, one of the marker body 118a and scale 114 defines a projection and the other defines a recess for receiving at least a portion of the projection so that the marker body 118a may be selectively positioned about scale 114. For example, in the form illustrated, the scale 114 defines a projection, such as tennon 114b, and the marker body 118a defines a channel, such as mortise 118c, for mating with the tennon 114b so that the body 118a may be slidingly positioned along the scale 114. More particularly, in a preferred embodiment, body 118a forms a generally C-shaped body which slides onto and along rail 114b of scale 114. It should be understood, however, that in alternate embodiments the marker 118 may define the projection and the scale 114 may define the recess for mating with the projection.

As illustrated in FIGS. 9A-D and 10, the pointer 118b may also include an indicator, such as line 118d, for identifying the blade angle or position selected by the operator. In this form, the indicator 118d is a line which the operator may use to align the marker 118 with the pointer 116 and/or scale 114. The pointer 118b is secured to marker body 118a via a fastener, such as screw 118e. With this configuration, the pointer 118b may be removed from the body 118a and/or replaced if the operator so desires. For example, the operator may remove the pointer 118b from body 118a to replace it with a new pointer 118b or with a pointer having a different type of indicator.

When in use, the operator may align the line 118d with the pointer 116 of spindle 110 and the markings on scale 114 to keep track of the blade angle or position desired. In the form illustrated, the line 118d of marker 118 and line 116d of pointer 116 align end to end when the pointer 116 has reached the blade angle represented by marker 118. In a preferred form, the operator will be able to tell when the scale 114, pointer 116 and marker 118 are in alignment because the lines or markings thereon will all align and appear to form one solid line. It should be understood, however, that in alternate embodiments, the marker 118 and pointer 116 may use an overlapping relationship similar to that discussed above between pointer 116 and scale 114. For example, in one form, the marker 118 may overlap the scale 114 so that lines 118d and 114a appear to make one line when in alignment, and pointer 116 may overlap marker 118 so that the lines 116d and 118*d* overlap so that they too appear to make one line when in alignment. In other embodiments, the marker 118 may overlap the pointer 116 or, in other embodiments, one of the scale 114, pointer 116 and marker 118 may be positioned intermediate the other two so that each will overlap with the other when their respective indicators or lines are in alignment.

In the embodiment illustrated in FIGS. 9A-D and 10, the marker 118 also has a mating relationship with scale 114 which allows the marker 118 to be secured in a selected position on scale 114 to keep track of a desired blade angle or position. For example, in the illustrated form, marker 118 includes a fastener, such as set screw 118*f*, which is fastened or screwed into a threaded bore defined by body 118*a* and may be used to secure the marker 118 at a desired position on the scale 114. Thus, when the marker 118 has been aligned with the pointer 116 at the blade angle or position desired to be retained for future use, the fastener 118*f* may be used to secure the marker 118 in position so that the operator may return to the selected blade angle or position at a later time.

It should be understood, however, that the mating relationship between the marker 118 and scale 114 may take a variety of forms other than the tongue and groove configuration illustrated in FIGS. 9A-D. For example, in an alternate embodiment, the marker 118 and scale 114 may utilize a magnetic relationship between one another for securing the marker 118 in a desired position on scale 114. In other embodiments, the marker 118 and scale 114 may utilize a frictional relationship between one another for securing the marker 118 in a desired position on scale 114. In yet other embodiments, the scale 114 may define a passageway with a captured body having a threaded bore into which the marker 118 may be fastened or screwed. It should also be understood that alternate types of tongue and groove relationships between marker 118 and scale 114 may be used besides the one illustrated in FIGS. 9A-D. For example, in an alternate embodiment, the marker 118 and scale 114 may utilize a dovetail joint connecting the marker 118 to the scale 114.

Regardless of the actual relationship between the marker 118 and scale 114, however, the cutting implement position memory indicator 36 will be able to keep track of a desired cutting implement position so that the operator may quickly and easily return the cutting implement to the selected position. In the preferred form, illustrated herein, the cutting implement position being kept track of is the angle of blade 26. In alternate embodiments, the position being kept track of may be the blade height. In yet other embodiments, the cutting tool 20 may include memory indicators for both the blade height and angle.

As mentioned above, the cutting tool 20 also includes a generally flat work surface, such as the table 24 illustrated in FIGS. 1A-F. In the form shown, table 24 includes a large generally rectangular surface which defines an opening 24*a* through which the cutting implement 26 extends in order to perform work on the workpiece. An access panel, such as table insert or throat plate 24*b*, is preferably disposed in the opening 24*a* of table 24 and can be removed from the table 24 in order to provide the operator access to the saw blade 26, arbor lock 28 and the interior of housing 22. The table insert 24*b* further defines an elongated opening through which the saw blade 26 may be raised, lowered or angled in order to perform a desired cutting action.

In a preferred form, the cutting tool 20 may be provided with a plurality of different table inserts which may be used to perform different cutting tasks. For example, a standard table insert may be used to provide the desired clearance for saw blade 26 to perform regular cutting tasks, such as splitting a workpiece. In addition, a dado table insert may be provided to provide sufficient clearance for a dado blade or dado set so that dado cuts may be made to a workpiece. In yet other forms, a zero clearance table insert may be provided so that zero clearance cuts may be performed on a workpiece. The various table inserts and cutting implements which are not in use, may be stored in the internal storage compartment 72 as discussed above.

The table insert 24*b* may also include alignment mechanisms, such as leveling screws 24*c*, which the operator may use to adjust and level the table insert 24*b* so that it is coplanar with the upper surface of table 24. In the form illustrated, the leveling screws 24*c* are disposed in threaded bores defined by the table insert 24*b* and make contact with tabs 24*e* (FIG. 7E), which support the table insert 24*b* and provide a base that the leveling screws 24*c* use to adjust the table insert 24*b*. The table 24 may also include accessory mating structures, such as T-slots 24*d*, so that conventional accessory items, such as miter gauge 76, may be used in connection with the cutting tool 20.

The cutting tool 20 also includes an extension, such as table extension 38, which extends from at least one side of the cutting tool and provides an upper surface that is generally coplanar to the upper surface of table 24. In a preferred form, the table extension 38 has a sturdy flat work surface portion, such as bench top 38*a*, which the operator may use with or without cutting tool 20. For example, in the form illustrated, bench top 38*a* is made from solid wood and provides a rugged workbench which the operator may use to support workpieces being used with or without cutting tool 20 or to perform projects with or without cutting tool 20.

The wood workbench 38*a* may also define a plurality of openings in the surface thereof to support conventional pegs or benchdogs and other tools, such as clamps, that the operator may desire to use in conjunction with the workbench extension 38. One type of tool that may be used in conjunction with the workbench extension 38 is disclosed in pending U.S. patent application Ser. No. 11/063,674 filed Feb. 23, 2005, which claims priority to U.S. Provisional Patent Application No. 60/546,853 filed Feb. 23, 2004, which are hereby incorporated herein by reference in their entirety. Other tools may include holdfast clamps, hold down clamps or the like.

In the form illustrated, openings 38*b* are cylindrical recesses within which conventional pegs or bench dogs may be mounted. The openings 38*b* are preferably aligned in two rows generally extending about the length of the extension 38 and are spaced evenly apart. By providing a number of openings 38*b*, the operator will be able to utilize the workbench 38*a* with a variety of different workpieces and for various different projects. It should be understood, however, that in alternate embodiments some or all of the openings 38*b* may be formed in shapes other than round cylindrical recesses. For example, some or all of the openings 38*b* may be square to work with squared tools and bench dogs. One advantage to providing the extension 38 with square openings 38*b* and square bench dogs or other tools, is that the square shape prevents the bench dogs or tools from rotating or turning and loosing their grip on the workpiece. The openings 38*b* may also be reinforced, such as by a metal insert or lining, which helps ensure that the tool inserted into opening 38*b* will not damage the opening 38*b* or extension 38.

The extension 38 may also include a clamp, such as vise 39. In the embodiment illustrated, the vise 39 is a traditional wood screw having a wood clamp member 39*a*, guide rails 39*b* and metal spindle screw 39*c*. The metal screw 39*c* is preferably made from heavy duty steel and is actuated via handle 39*d*, which, in the illustrated embodiment, includes a finished wood handle connected to the spindle 39*c* via a metal eyebolt. Thus, the handle 39*d* forms a slotted T-shape handle which can be operated in the same manner as most conventional handles. The vise 39 may be used to secure a workpiece or portion thereof between the clamp member 39*a* and the end of bench top 38*a*. With this configuration, the wood clamp member 39*a* and end of bench top 38*a* act as a clamp with wood jaws. An advantage to using wood jaws over metal vise jaws is that wood jaws are less likely to mar the workpiece. It should be understood, however, that the cutting tool 20 may also be provided with attachments or accessories for adding to the extension 38, such as for example, jaw pad attachments which can be added to the clamp member 39*a* and end of bench top 38*a* if desired.

In a preferred form, the vise 39 also includes openings, such as recesses 39*e*, to which accessory tools, such as bench dogs or clamps, may be attached. In the form illustrated, the recesses 39*e* are similar in shape to the openings 38*b* of bench top 38*a* and are aligned with the rows of openings 38*b* of bench top 38*a*. An operator may insert a tool, such as a bench dog, into one of the openings 38*b* and one of the openings 39*e* and rotate handle 39*d* in one direction to use the bench dogs as clamp members for clamping a workpiece or rotate the handle 39*d* in an opposite direction to use the bench dogs as spreaders for spreading the workpiece apart.

The extension 38 will also preferably have at least one support for maintaining the height of extension 38 so that its upper surface remains generally coplanar with the upper surface of table 24. In the embodiment illustrated in FIGS. 1A-F, the support is in the form of a leg 38*f*, which extends down from the bottom of the distal end of bench top 38*a* to support the extension 38. The opposite end of bench top 38*a* is connected to the table 24 via fasteners, such as bolts, to ensure that the extension is securely fastened to the cutting tool 20. The leg 38*f* will also preferably include wheel assemblies, such as castors 38*g*, which may be lowered below the bottom surface of leg 38*f* so that the extension can be moved about with the cutting tool 20 when the mobility system 34 is in its extended position.

The cutting tool 20 may also include a guide, such as rail 120, which is attached to the front of the cutting tool 20 to allow conventional cutting tool equipment or accessories, such as fence 122, to be used in conjunction therewith. More particularly, in the form illustrated, the rail 120 is connected to table 24 and extends along the length of table 24 so that the fence 122 may be moved along the upper surface of table 24 and secured in a desired position with respect to table 24. In a preferred form, the rail 120 will extend beyond the entire length of the table 24 and the entire length of table extension 38 so that an operator may use the entire surface of the table 24 and extension 38 to support a workpiece. This also allows the fence 122 to be positioned about the entire table 24 and extension 38 so that it may be used with workpieces of various shapes and sizes, particularly large workpieces. In alternate embodiments, the cutting tool 20 may also include a second rail located on the opposite side of table 24 and extension 38 so that fences that use two rails for moving along the cutting tool table 24 and extension 38 may be used in conjunction with cutting tool 20.

The cutting tool 20 may also include other conventional cutting tool equipment or accessories, such as blade guard and splitter assembly 124. In the embodiment illustrated, a traditional splitter 124*a* is connected to the motor and trunnion assembly 80 through an opening located in rear panel 22*c* of cutting tool housing 22. By connecting the blade guard and splitter assembly 124 to the motor and trunnion assembly 80, the assembly 124 will be moved along with the blade 26 to ensure that the splitter 124*a* and guard 124*b* are always properly aligned with the blade 26. In the form illustrated, the splitter 124*a* extends along a portion of table 24 behind, and in line with, the saw blade 26 and helps keep the cut end of the workpiece split as the workpiece is passed through the blade 26. In a preferred form, the splitter 124*a* also includes conventional anti-kickback pawls for catching the workpiece and assisting in preventing kickbacks thereof. The blade guard 124*b* is connected to the splitter 124*a* and positioned so that it will cover at least a portion of the saw blade 124*a* throughout its operation.

It should be understood, however, that a conventional riving knife may be used in place of the guard and splitter assembly 124 if desired. For example, in a preferred embodiment, cutting tool 20 will include a riving knife connected to the motor and trunnion assembly 80 through opening 24*a* in table 24, rather than the guard and splitter assembly 124 which extends around the back of table 24 and into housing 22 through rear side panel 22*c*. Like the guard and splitter assembly 124, however, the riving knife will be connected to the motor and trunnion assembly 80 so that it rises, lowers and tilts along with the blade 26. With this configuration, a different table insert 24*b* will be used in which an elongated opening is provided to allow for both the saw blade 26 and the riving knife to extend out from table 24.

Lastly, the cutting tool 20 will also include an actuator, such as power switch assembly 126, which may be used to supply power or turn on and off the cutting tool 20. In the embodiment illustrated, switch assembly 126 includes a housing 126*a* which is connected to rail 120 and has a cable or conduit 126*b* connecting the housing 126*a* to motor 80*a* and/or a power supply, such as an AC outlet. The switch housing 126*a* is connected to a first input, such as switch 126*c*, for starting the cutting tool 20, and a second input, such as switch 126*d*, for stopping the cutting tool 20. In a preferred form, the first switch 126*c* is located within the second switch 126*d* and is recessed therein so as to prevent inadvertent or accidental operation of the cutting tool 20, such as by bumping into the actuator 126. More particularly, in the embodiment illustrated, first switch 126*c* is a recessed push button switch located within the center of second switch 126*d*. The switches 126*c* and 126*d* are both preferably round momentary switches with the second switch 126*d* being much larger than the first switch 126*c*. Thus, with this configuration, the operator must reach a finger into the central opening of second switch 126*d*, without actuating second switch 126*d*, in order to actuate first switch 126*c* and turn on cutting tool 20. However, the operator need only press or bump into second switch 126*d* in order to turn off cutting tool 20.

As illustrated in FIGS. 1A, 1C-E and 11A-B, the second switch 126*d* will preferably form a cylindrical plastic sleeve within which the first switch 126*c* is disposed. The cylindrical sleeve of switch 126*d* will also preferably have a flanged end which increases the surface area of the switch that the operator may use to actuate switch 126*d*. The flanged end of switch 126*d* creates a large, round, paddle-like switch which the operator may easily hit or press in order to turn off the power tool 20. Conversely, first switch 126*c* will preferably comprise a small cylindrical switch recessed into the central opening defined by second switch 126*d*. In a preferred form, the first switch 126*c* will be made of a translucent plastic material and will include a light emitting object, such as an LED, which can be illuminated when the cutting tool 20 is connected to power. In this manner, first switch 126*c* will be easily visible to the operator despite the fact that it is recessed within second switch 126*d*. The second switch 126*d* may also be made of a translucent material and have an illumination device if desired. In other embodiments, one or more of the switches 126c-d may simply be made from colored plastic. For example, in the embodiment illustrated, the first switch 126c is made from a green, translucent, plastic that appears bright green when illuminated and the second switch 126d is made from a red, non-translucent, plastic.

In alternate embodiments, the actuator 126 may be located in different positions about the cutting tool 20. For example, in one form, the actuator 126 may be connected directly to the front panel 22a of cutting tool housing 22, rather than railing 120. In other embodiments, the actuator 126 may be connected to the right side 22b or left side 22d of housing 22. In yet other embodiments, the actuator 126 may be configured using a different input design and layout. For example, in one form a single input switch may be used in place of first and second switch members 126c and 126d. In another form, the actuator 126 may have first and second switches, however, the switches may be rectangular in shape and placed one atop the other. For example, in one embodiment, the first switch 126c may be a small rectangular button extending from housing 126a and the second switch 126d may be a substantially larger rectangular button positioned above the first switch 126c and extending out further from housing 126a.

Other parts, accessories and features may be provided with cutting tool 20. Some of these parts, accessories and features are disclosed in U.S. patent application Ser. No. 10/944,165 filed Sep. 17, 2004, which claims priority to U.S. Provisional Patent Application No. 60/503,680 filed Sep. 17, 2003, which are hereby incorporated herein by reference in their entirety.

Thus, in accordance with the present invention, a cutting tool and parts and accessories therefor have been provided that fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A cutting tool, comprising:
a housing having a generally flat upper surface defining an opening therein and an enclosed base upon which the flat upper surface is supported, the enclosed base defining a first perimeter and forming a cavity therein, the cavity having a second perimeter that is substantially the same as or smaller than the first perimeter of the enclosed base of the housing;
a cutting implement extending from the opening of the housing;
an internal retractable base assembly connected to the housing and positioned at least substantially within the cavity defined by the enclosed base and movable between a first position wherein the cutting tool rests on a mobile portion of the base assembly so that the cutting tool may be moved about a work surface and a second position wherein the cutting tool rests on a stationary portion so that the cutting tool is stationary with respect to the work surface, said internal retractable base assembly including:
a plurality of wheels of said mobile portion on which said cutting tool rests when said internal retractable base assembly is in said first position,
a plurality of vertical drive devices constructed and operable to move said internal retractable base assembly between said first and second positions, each of said vertical drive devices including a toothed gear,
an endless drive linkage extending between the toothed gears of said plurality of vertical drive devices to substantially simultaneously operate the plurality of vertical drive devices to move the retractable base assembly between the first and second positions,
a drive shaft connected to drive said endless drive linkage; and
a spindle extending from the housing and connected to the drive shaft, the spindle being operable to move the internal retractable base assembly between the first and second positions.

2. A cutting tool according to claim 1, wherein the spindle is a multifunctional spindle linearly movable from a first position wherein the spindle is operable to make an adjustment to the cutting tool and a second position wherein the spindle is operable to move the internal retractable base assembly between the first and second positions.

3. A cutting tool according to claim 2, wherein the multifunctional spindle drives a gear which in turn moves the internal retractable base between an extended position and an retracted position.

4. A cutting tool according to claim 1 wherein the spindle is operably connected to the drive shaft via a gear assembly and the spindle is rotated by actuating a handle connected to an end of the spindle which when rotated results in a corresponding rotation of the drive shaft of the internal retractable base assembly.

5. A cutting tool according to claim 1, wherein the plurality of wheels are interconnected to one another so that extension or retraction movement of one wheel results in a corresponding extension or retraction movement of all other wheels.

6. A cutting tool according to claim 5, wherein the drive shaft drives at least one screw shaft of the vertical drive devices to adjust at least one of the wheels between a first wheel position and a second wheel position.

7. A cutting tool according to claim 1, further comprising: an additional sprocket connected to the housing and engaging the endless drive linkage to provide appropriate tension on the endless drive linkage.

8. A cutting tool according to claim 1, wherein the endless drive linkage comprises a belt.

9. A cutting tool according to claim 1 further comprising a second spindle extending from the housing and connected to the cutting implement for adjusting a position of the cutting implement.

10. A cutting tool according to claim 9 wherein the second spindle adjusts a blade height or a blade angle of the cutting implement.

11. A cutting tool comprising:
a housing having a generally flat upper surface defining an opening therein through which a cutting implement may be at least partially disposed and an enclosed base upon which the flat upper surface is supported;
an internal retractable mobile base assembly connected to the housing and movable between an extended position wherein the cutting tool rests on a portion of the mobile base assembly so that the cutting tool may be moved about a work surface and a retracted position wherein the cutting tool rests firmly on the enclosed base so that the cutting tool is stationary with respect to the work surface; and
wherein a multifunctional spindle extends from the housing and is operable to move the internal retractable mobile base between the extended and retracted positions, the multifunctional spindle is movable between a first position wherein rotation of the spindle adjusts a position of the cutting implement and a second position wherein rotation of the shaft spindle adjusts a position of the mobile base assembly connected to the cutting tool.

12. A cutting tool comprising:
a housing having a generally flat upper surface defining an opening therein and an enclosed base upon which the flat upper surface is supported;
a cutting implement extending from the opening of the housing; and an internal retractable mobile base assembly connected to the housing and movable between an extended position wherein the cutting tool rests on a portion of the mobile base assembly so that the cutting tool may be moved about a work surface and a retracted position wherein the cutting tool rests firmly on the enclosed base so that the cutting tool is stationary with respect to the work surface; and
a multifunctional spindle movable between a first position wherein rotation of the spindle adjusts a position of the cutting implement and a second position wherein rotation of the spindle adjusts a position of the mobile base assembly connected to the cutting tool.

13. A cutting tool according to claim 12 wherein the movement of the spindle to the first position engages a trunnion shaft such that rotation of the spindle causes rotation of the trunnion shaft.

14. A cutting tool according to claim 13 wherein the trunnion shaft includes a gear and the gear engages a mating surface on a cutting implement trunnion such that rotation of the trunnion shaft results in a corresponding movement of the cutting implement trunnion to control an angle or tilt of the cutting implement.

15. A cutting tool according to claim 14 wherein the spindle is rotated by actuating a handle connected to an end of the spindle which in turn rotates the trunnion shaft causing the cutting implement to move.

16. A cutting tool according to claim 12 wherein the movement of the shaft multifunctional spindle to the second position engages a first gear connected to a mobile base assembly with a second gear connected to the multifunctional spindle.

17. A cutting tool according to claim 16 wherein the first gear is connected to a primary shaft and drives a wheel member between a first wheel position wherein the wheel is extended from the enclosed base and a second wheel position wherein the wheel is retracted into the enclosed base.

18. A cutting tool according to claim 17 wherein the wheel member comprises a plurality of wheels interconnected to one another so that movement of one wheel results in a corresponding movement of all other wheels.

19. A cutting tool according to claim 16 wherein the spindle is rotated by actuating a handle connected to an end of the spindle which in turn rotates the second gear causing the second gear to act upon the first gear.

20. A cutting tool according to claim 17 wherein the primary shaft drives at least one screw shaft and sprocket attachment to adjust the wheel member between the first wheel position and the second wheel position.

21. A cutting tool according to claim 12 wherein the first spindle position comprises the spindle being disengaged from a first gear connected to the mobile base assembly and engaged with a trunnion shaft.

22. A cutting tool according to claim 12 wherein the second spindle position comprises the spindle being disengaged from a trunnion shaft and engaged with a first gear connected to the mobile base assembly.

23. A cutting tool, comprising:
a housing having a generally flat upper surface defining an opening therein and an enclosed base upon which the generally flat upper surface is supported, the enclosed base defining a first perimeter and forming a cavity within the housing with a cavity opening located below the housing, the cavity having a second perimeter that is substantially similar to or smaller than the first perimeter of the enclosed base of the housing;
a cutting implement disposed at least partially within the opening of the flat upper surface of the housing,
an internal retractable mobile base assembly connected to the housing and positioned within the cavity of the enclosed base and movable between an extended position wherein the cutting tool rests on a plurality of wheels of the mobile base assembly extending from the cavity opening so that the cutting tool may be moved about a work surface and a retracted position wherein the cutting tool rests on the enclosed base so that the cutting tool is stationary with respect to the work surface;
a plurality of vertical drive devices, each connected to one of said plurality of wheels;
an endless drive linkage connected each of said plurality of vertical drive devices; and
a first shaft of the internal retractable mobile base assembly rotatably connected to one of said vertical drive devices such that rotation of the first shaft drives the plurality of vertical drive devices between a first wheel position wherein the wheels are extended into contact with the work surface and a second wheel position wherein the wheels are retracted from contact with the work surface.

24. A cutting tool according to claim 23, wherein the endless drive linkage comprises at least one of a chain and a belt.

25. A cutting tool comprising:
a housing having a generally flat upper surface defining an opening therein and a base upon which the generally flat upper surface is supported, the base defining a first perimeter and forming a hidden cavity therein with a cavity opening located below the housing, the cavity having a second perimeter that is substantially the same as or smaller than the first perimeter of the base of the housing;
a cutting implement disposed at least partially within the opening of the generally flat upper surface of the housing;
an internal retractable mobile base assembly operably connected to the housing and disposed at least partially within the cavity of the base and movable between a first position wherein the cutting tool rests on feet and is kept from moving with respect to a work surface and a second position wherein the cutting tool may be moved about the work surface, said internal retractable mobile base assembly including a plurality of threaded drives operable to move between the first and second positions and an endless drive linkage connected between all of the threaded drives; and
an actuator extending from the housing and connected to the internal retractable mobile base assembly, the actuator being operable to transmit power through the endless drive linkage to the threaded drives to move the internal retractable mobile base assembly between the first and second positions.

26. A cutting tool according to claim 25 wherein the actuator comprises a first shaft rotatably connected to the internal retractable mobile base assembly wherein rotation of the first shaft causes extension or retraction of the mobile base.

27. A cutting tool according to claim 26 wherein the actuator comprises a second shaft operably connected to the first shaft for driving the first shaft the second shaft being actuated by rotating a handle connected to an end of the second shaft which in turn rotates the first shaft of the internal retractable mobile base assembly.

28. A cutting tool according to claim 26 wherein the first shaft is operably connected to a gear member for driving a drive member which causes extension or retraction of the mobile base.

29. A cutting tool according to claim 26, wherein the first shaft drives at least one screw shaft of the threaded drives connected to the internal retractable mobile base which is movable via rotation of the first drive shaft between an extended and retracted position to bring a wheel member connected to the base into or out of engagement with the work surface.

30. A cutting tool according to claim 29, wherein a plurality of screw shafts including the at least one screw shaft are interconnected using the endless drive linkage, wherein plurality of screw shafts may be collectively extended and retracted to bring a wheel member connected to the base into or out of engagement with the work surface.

31. A cutting tool according to claim 30, wherein the endless drive linkage comprises a chain and the chain is driven by a sprocket connected to the first shaft.

32. A cutting tool according to claim 31 wherein an additional sprocket connected to the housing engages the chain to provide appropriate tension on the chain.

33. A cutting tool according to claim 10 wherein the actuator extending from the housing comprises a first rotatable spindle having a hand wheel for rotating the spindle in a first direction to move the internal retractable mobile base assembly to the first position and for rotating the spindle in a second direction opposite the first to move the internal retractable mobile base assembly to the second position; and the tool further comprising
 a second rotatable spindle having a second hand wheel for rotating the spindle to adjust a position of the cutting implement.

34. A stationary power tool having an integral mobile base assembly, comprising:
 a housing having a generally flat upper surface defining an opening therein through which a cutting implement may be at least partially disposed and a base for supporting the table saw upon a floor and upon which the generally flat upper surface is supported, the base defining a first perimeter and forming a cavity therein, the cavity having a second perimeter that is substantially the same as or smaller than the first perimeter of the enclosed base of the housing;
 an integral mobile base assembly connected to the housing and positioned at least substantially within the first perimeter of the base;
 a first shaft of the integral mobile base assembly rotatably connected to at least one of a plurality of wheels of the integral mobile base assembly;
 a plurality of vertical drives operable to move between an extended position and a retracted position;
 a plurality of sprockets with each sprocket connected to a different one of the plurality of the vertical drives; and
 a chain or belt member connecting all of the plurality of vertical drive by the plurality of sprockets, such that rotation of the first shaft moves the chain or belt member thereby rotating the plurality of sprockets resulting in corresponding movement of all of the plurality of vertical drives between a first position wherein the plurality of wheels are in contact with the floor when the stationary power tool is not in use and intended to be moved and a second position wherein the plurality of wheels are moved out of contact with the floor when the stationary power tool is to be used.

35. A stationary power tool according to claim 34, wherein each of the plurality of sprockets is integrally connected to a different one of the plurality of wheels by a screw shaft of a corresponding one of said vertical drives to adjust the plurality of wheels between the first wheel position and the second wheel position.

36. A stationary power tool according to claim 34 wherein an additional sprocket connected to the housing engages the chain or belt member to provide appropriate tension thereon.

37. A stationary power tool according to claim 34 wherein a second shaft is operably connected to the first shaft of the integral mobile base assembly and the first shaft is driven thereby.

38. A stationary power tool having an integral mobile base assembly comprising:
 a housing having a generally flat upper surface defining a cutting implement opening therein and an enclosed base upon which the flat upper surface is supported and having a skirt member with extension members extending therefrom, the skirt member defining a first perimeter and forming a cavity therein, the cavity having a second perimeter that is substantially the same as or smaller than the first perimeter of the skirt member of the housing;
 an integral mobile base assembly operably connected to the housing and disposed substantially within the cavity of the base the integral mobile base assembly being movable between a first position wherein the cutting tool is kept from moving with respect to a work surface via the extension members and a second position wherein the cutting tool rests on a plurality of wheels located within the cavity of the enclosed base and may be moved about the work surface, the integral mobile base assembly including a plurality of drive devices constructed and operable to move between the first and second positions and an endless drive linkage extending between all of the drive devices to operate the drives simultaneously; and
 an actuator extending from the housing and connected to the integral mobile base assembly, the actuator being operable to move the integral mobile base assembly between the first and second positions.

39. A stationary power tool according to claim 38 wherein the extension members form posts or feet having a lower surface upon which the stationary power tool rests when the integral mobile base assembly is in the first position.

40. A stationary power tool according to claim 39 wherein the posts or feet are integrally formed into the skirt member.

41. A stationary power tool according to claim 39 wherein the integral mobile base assembly has four corner regions and the posts or feet are located near the corner regions of the integral mobile base assembly.

42. A stationary power tool according to claim 38 wherein the actuator extending from the housing comprises a first rotatable spindle having a hand wheel for rotating the spindle in a first direction to move the integral mobile base assembly to the first position and for rotating the spindle in a second direction opposite the first to move the integral mobile base assembly to the second position and wherein the power tool further comprises:
 a second rotatable spindle extending from the housing and connected to the cutting implement, the second spindle having a second hand wheel for rotating the spindle to adjust a position of the cutting implement.

43. A stationary power tool according to claim 42 wherein the second hand wheel is rotatable to adjust a height of the cutting implement with respect to the cutting implement opening in the generally flat upper surface of the housing and wherein the power tool further comprises:
   a third rotatable spindle extending from the housing and connected to the cutting implement, the third spindle having a third hand wheel that is rotatable to adjust an angle of the cutting implement with respect to the cutting implement opening in the generally flat upper surface of the housing.

44. A stationary power tool having an integral mobile base assembly comprising:
   a housing having a generally flat upper surface defining a cutting implement opening therein and a base upon which the flat upper surface is supported, the base defining a cavity therein and having feet extending therefrom, with the base have a first perimeter defining an outer bounds of the housing and the cavity having a second perimeter defining an outer bounds of the cavity which is smaller than the first perimeter of the housing;
   an integral mobile base assembly connected to the housing such that a substantial portion of the mobile base assembly is disposed within the first perimeter of the housing, the integral mobile base assembly being movable between a first position wherein the cutting tool is kept from moving with respect to a work surface via the feet extending from the base and a second position wherein the cutting tool rests on a plurality of wheels connected to the integral mobile base assembly so that the stationary power tool may be moved about the work surface, said integral mobile base assembly including a plurality of vertical drive devices and an endless drive linkage extending between each of said vertical drive devices; and
   an actuator extending from the housing and connected to the integral mobile base assembly, the actuator being operable to move the integral mobile base assembly between the first and second positions.

\* \* \* \* \*